United States Patent
Kudo et al.

(10) Patent No.: US 10,191,225 B2
(45) Date of Patent: Jan. 29, 2019

(54) OPTICAL CONNECTOR

(71) Applicant: Yazaki Corporation, Tokyo (JP)

(72) Inventors: Takamichi Kudo, Susono (JP); Hiroshi Miyazaki, Tokyo (JP); Akinori Tashiro, Susono (JP); Masafumi Noguchi, Tokyo (JP); Shoichi Watai, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 15/237,926

(22) Filed: Aug. 16, 2016

(65) Prior Publication Data

US 2017/0052327 A1  Feb. 23, 2017

(30) Foreign Application Priority Data

Aug. 18, 2015 (JP) ................................. 2015-160862

(51) Int. Cl.
  *G02B 6/38* (2006.01)
(52) U.S. Cl.
  CPC .......... *G02B 6/3857* (2013.01); *G02B 6/387* (2013.01); *G02B 6/3874* (2013.01); *G02B 6/3885* (2013.01)
(58) Field of Classification Search
  USPC .......................................................... 385/62
  See application file for complete search history.

(56) References Cited

U.S. PATENT DOCUMENTS

| | | | | |
|---|---|---|---|---|
| 4,127,312 A * | 11/1978 | Fleischhacker | ...... | H01R 4/2429 439/403 |
| 4,787,704 A * | 11/1988 | Knecht | ............... | G02B 6/3805 385/62 |
| 4,986,625 A * | 1/1991 | Yamada | ............... | G02B 6/3801 385/55 |
| 5,315,679 A * | 5/1994 | Baldwin | ............... | G02B 6/3869 385/76 |
| 5,714,717 A * | 2/1998 | Nakagome | ........... | H01R 4/2433 174/91 |
| 5,962,811 A * | 10/1999 | Rodrigues | ............... | H02G 15/10 174/76 |
| 6,139,194 A | 10/2000 | Bella et al. | | |
| 9,563,025 B2 | 2/2017 | Yamagata et al. | | |
| 2005/0167147 A1* | 8/2005 | Marsac | ................ | G02B 6/4446 174/92 |

(Continued)

FOREIGN PATENT DOCUMENTS

| | | |
|---|---|---|
| EP | 2876472 A1 | 5/2015 |
| JP | 62-159108 A | 7/1987 |

(Continued)

OTHER PUBLICATIONS

Office Action dated Oct. 31, 2017, issued for the Japanese patent application No. 2015-160862 and English translation thereof.

*Primary Examiner* — Eric Wong
(74) *Attorney, Agent, or Firm* — Locke Lord LLP

(57) ABSTRACT

A cover part of an optical fiber is sandwiched and pressed between a pressure welding blade and a bottom surface part. As a result of this, in a case where an external force which pulls out the optical fiber from a housing, movement of the optical fiber is suppressed by a pressing force, which makes it difficult for a ferrule to go away from a mating optical fiber. Thus, efficiency in communication with the mating optical connector can be improved.

13 Claims, 24 Drawing Sheets

(56) References Cited

U.S. PATENT DOCUMENTS

| | | | | |
|---|---|---|---|---|
| 2006/0045440 A1* | 3/2006 | Tinucci | ............... | G02B 6/4471 |
| | | | | 385/100 |
| 2014/0112624 A1* | 4/2014 | Doyle | ................. | G02B 6/3858 |
| | | | | 385/81 |
| 2014/0233896 A1* | 8/2014 | Ishigami | .............. | G02B 6/4292 |
| | | | | 385/81 |
| 2015/0268423 A1* | 9/2015 | Burkholder | ............ | G02B 6/387 |
| | | | | 385/76 |
| 2015/0338581 A1* | 11/2015 | Hikosaka | ............. | G02B 6/3887 |
| | | | | 385/83 |
| 2016/0266327 A1* | 9/2016 | Yamagata | ............ | G02B 6/3869 |

FOREIGN PATENT DOCUMENTS

| | | |
|---|---|---|
| JP | 2005-114770 A | 4/2005 |
| JP | 2014-048408 A | 3/2014 |
| JP | 2015-049382 A | 3/2015 |
| WO | 2014/034429 A1 | 3/2014 |
| WO | 2015/108061 A1 | 7/2015 |

\* cited by examiner

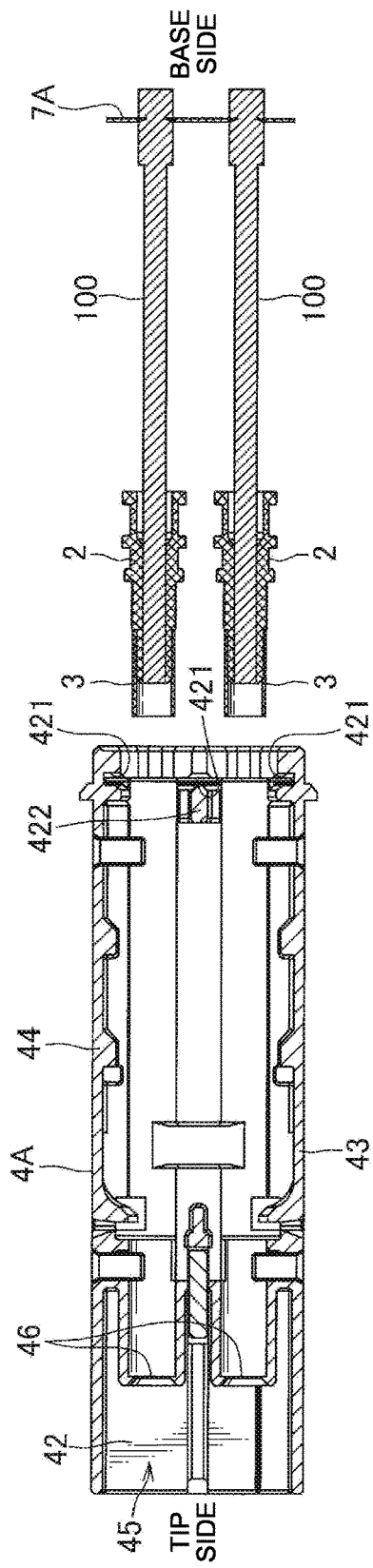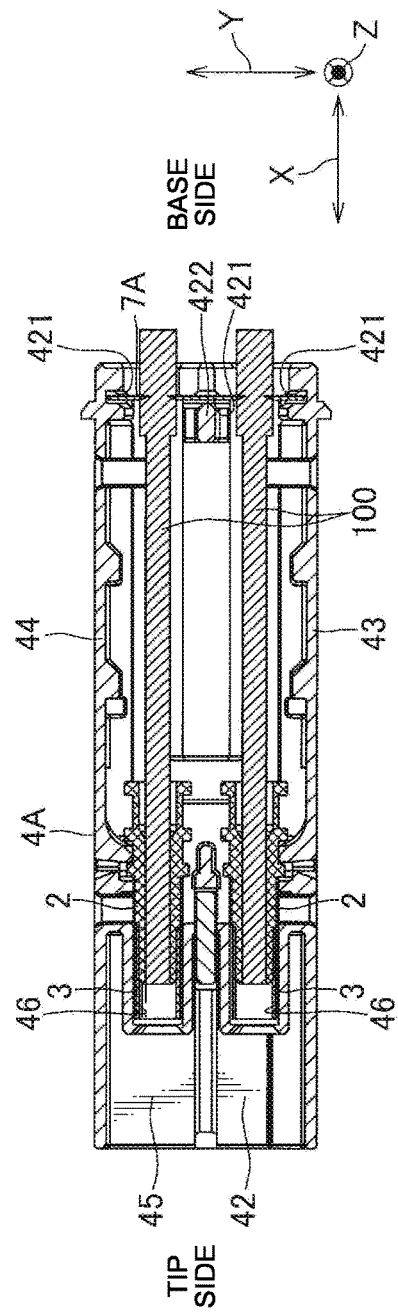

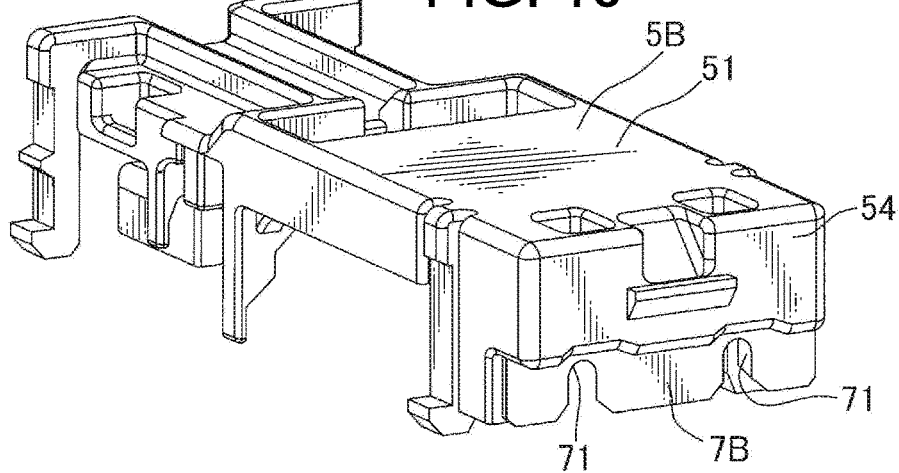
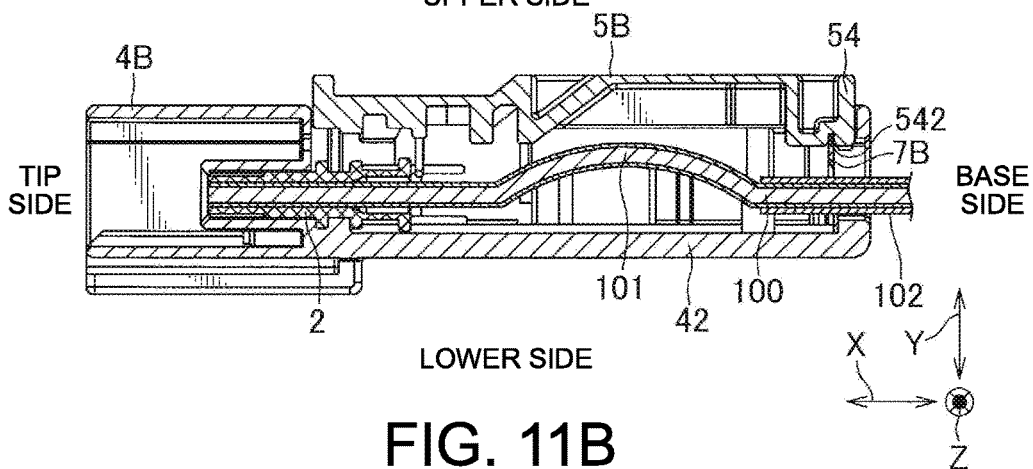
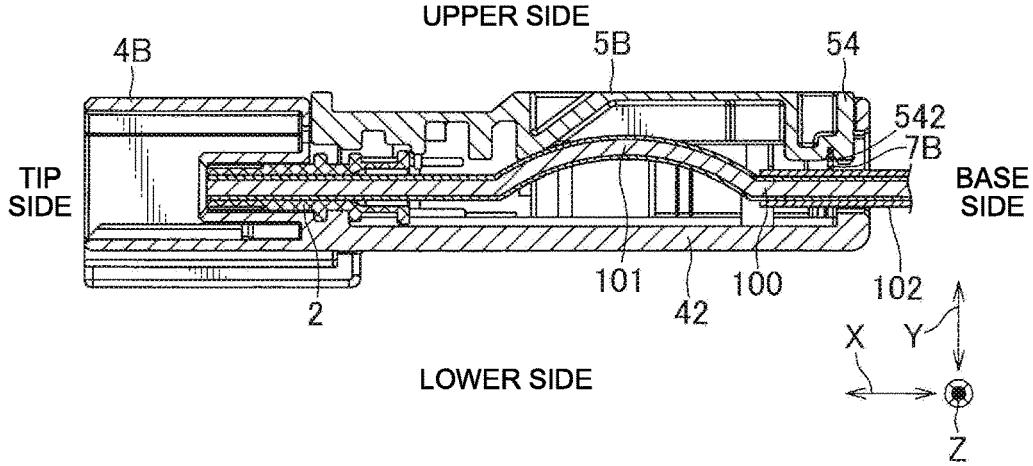

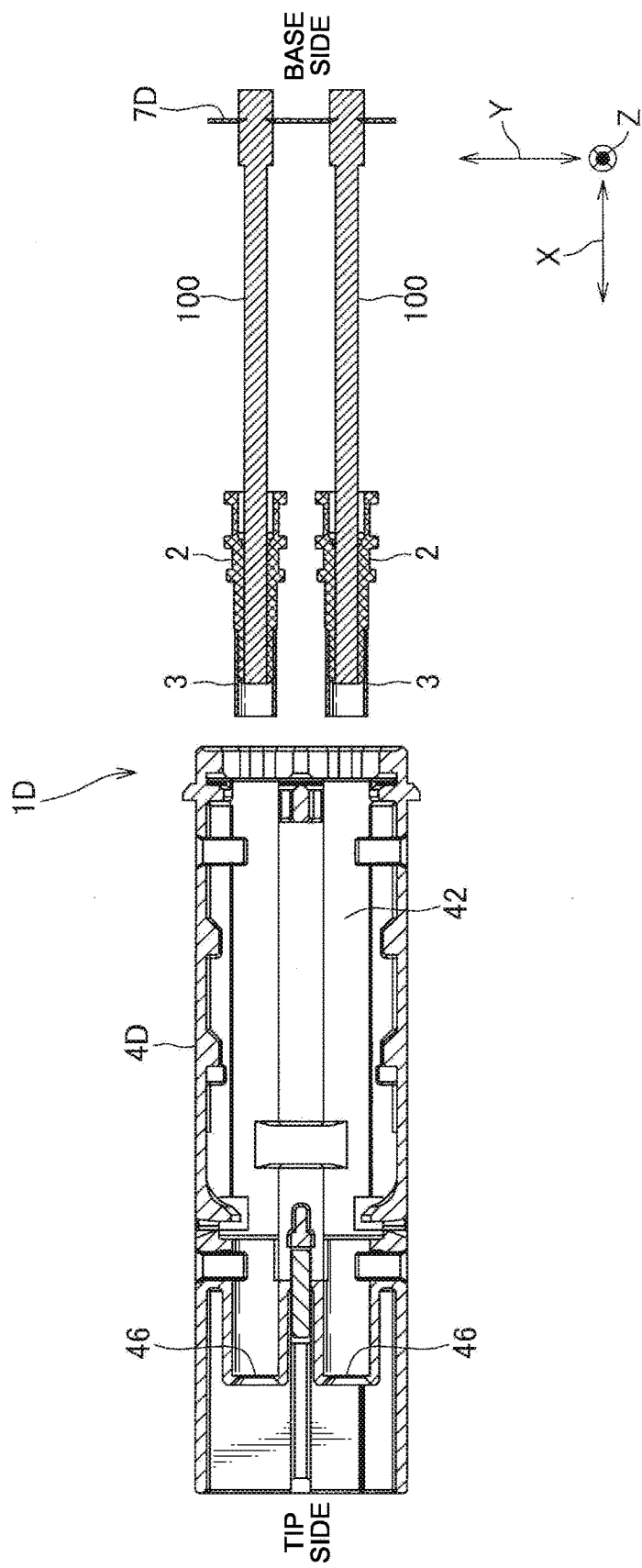

FIG. 21
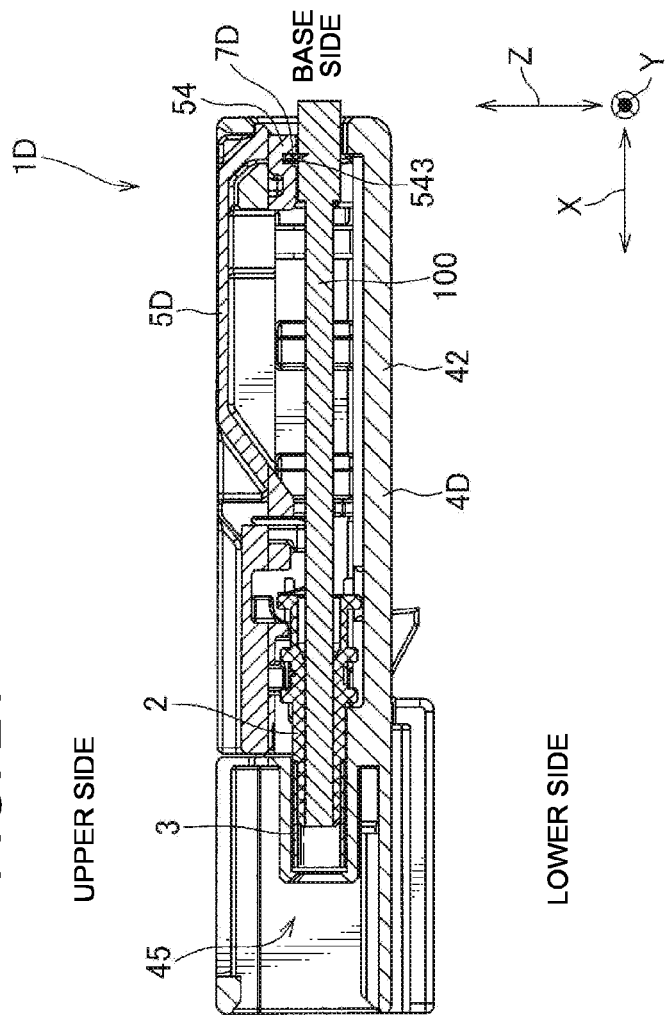
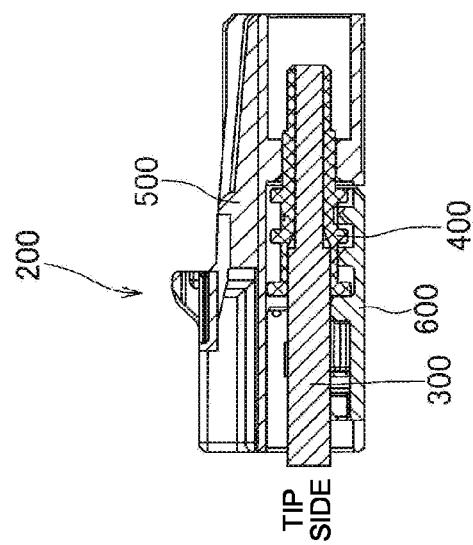

OPTICAL CONNECTOR

BACKGROUND

Technical Field

The present invention relates to an optical connector including a connection end part provided at a tip end of an optical fiber, and a housing which houses the connection end part.

Related Art

Conventionally, as an optical connector used for interconnection between optical fibers, an optical connector including a ferrule (a connection end part) provided at a tip end of an optical fiber, a housing which houses the ferrule, and a spring part, is proposed (refer to JP 2014-48408 A, for example). In an optical connector described in JP 2014-48408 A, a ferrule is pressed toward a tip end (toward a mating optical fiber) by a spring part, to be brought close to the mating optical fiber (or a ferrule), in an attempt to improve communication efficiency.

Patent Literature 1: JP 2014-48408 A

Meanwhile, in an optical connector, an external force which pulls an optical fiber and causes a ferrule to go away from a mating optical fiber is applied in some cases. In the optical connector described in JP 2014-48408 A, if an external force is smaller than an elastic force of the spring part, the ferrule and the mating optical fiber are kept connected with each other. However, if an external force increases, the ferrule is likely to move away from the mating optical fiber, which reduces communication efficiency. Also, if an external force is repeatedly applied, the spring part is deteriorated so that an elastic force is reduced in some cases. Thus, communication efficiency is more likely to be reduced.

SUMMARY

An object of the present invention is to provide an optical connector which can improve efficiency in communication with a mating optical connector.

In order to solve the above issue, the invention according to a first aspect is an optical connector including: a connection end part provided at a tip end of an optical fiber; a cylindrical housing which houses the connection end part and includes an opening part in a side surface; a lid part which is attached to the housing so as to cover the opening part; and a plate-shaped pressure crimping member which includes a recess part where the optical fiber is placed, wherein the pressure crimping member is provided in such a manner that an opening of the recess part is oriented to a facing surface part of the housing, which faces the opening part, and the lid part is attached to the housing, so that the optical fiber is sandwiched and pressed between the pressure crimping member and the facing surface part.

The invention according to a second aspect is the invention according to the first aspect, wherein the housing includes a first housing groove part which houses the pressure crimping member, and a stopper wall part which is erected from the facing surface part and retrains the pressure crimping member from moving from the first housing groove part toward a tip end of the optical fiber.

The invention according to a third aspect is the invention according to the first aspect, wherein the pressure crimping member is formed integrally with the lid part.

The invention according to a fourth aspect is the invention according to the third aspect, wherein the lid part has an end which is closer to a base end of the optical fiber and is a free end, and an end which is closer to a tip end of the optical fiber and is pivotally supported by the housing, and the pressure crimping member is provided on a side where the free end is provided.

The invention according to a fifth aspect is the invention according to the first or second aspect, wherein the lid part includes a second housing groove part which houses a portion of the pressure crimping member, which is opposite to the recess part.

The invention according to a sixth aspect is the invention according to the fifth aspect, wherein the second housing groove part has a dimension which allows the pressure crimping member to move in a lengthwise direction of the optical fiber within the second housing groove part.

The invention according to a seventh aspect is an optical connector including: a connection end part provided at a tip end of an optical fiber; a cylindrical housing which houses the connection end part and includes an opening part in a side surface; and a lid part which is attached to the housing so as to cover the opening part, wherein at least one of the housing and the lid part includes a movement restraining part which comes into contact with the optical fiber, to restrain the optical fiber from moving in a lengthwise direction.

The invention according to an eighth aspect is the invention according to the seventh aspect, wherein the movement restraining part is a protrusion part which protrudes from the housing or the lid part.

The invention according to a ninth aspect is the invention according to the seventh aspect, wherein the movement restraining part includes a plate-shaped pressure crimping member which is provided in one of the housing and the lid part, and an elastic member which is provided in the other of the housing and the lid part, and the pressure crimping member includes a recess part where the optical fiber is placed, which is open to the other of the housing and the lid part, and the lid part is attached to the housing, so that the optical fiber is sandwiched and pressed between the pressure crimping member and the elastic member.

The invention according to a tenth aspect is the invention according to the ninth aspect, wherein the elastic member has a tapering shape and comes into contact with the optical fiber at a tip end.

The invention according to an eleventh aspect is the invention according to the ninth aspect, wherein the elastic member includes irregularities on a side closer to the optical fiber.

The invention according to a twelfth aspect is an optical connector including: a connection end part provided at tip end of an optical fiber; a cylindrical housing which houses the connection end part and includes an opening part in a side surface; a lid part which is attached to the housing so as to cover the opening part; and a crimping member which is crimped onto an outer surface of the optical fiber and is formed in a shape of a polygonal column, wherein at least one of the housing and the lid part includes a housing groove part which comes into contact with plural side surfaces of the crimping member, and a retreat restraining part which is able to come into contact with the crimping member from a side where a base end of the optical fiber is provided.

According to the present invention according to the first aspect, as a result of the optical fiber being sandwiched and pressed between the pressure crimping member and the facing surface part, movement of the optical fiber is suppressed by a pressing force in a case where an external force which pulls out the optical fiber from the housing is applied, which makes it difficult for the connection end part to go away from a mating optical fiber. As a result, efficiency in communication with a mating optical connector can be improved.

According to the present invention according to the second aspect, because of inclusion of the first housing groove part which houses the pressure crimping member in the housing, movement of the optical fiber can be further suppressed in a case where an external force which pulls out the optical fiber from the housing is applied. Also, because of inclusion of the stopper wall part in the housing, the pressure crimping member is restrained from moving toward a tip end. Thus, it is possible to improve mountability of the lid part in the housing.

According to the present invention according to the third aspect, as a result of the pressure crimping member being formed integrally with the lid part, the number of parts can be reduced, so that mountability can be further suppressed.

According to the present invention according to the fourth aspect, it is possible to mount the lid part in the housing by turning the lid part, so that mountability can be further improved.

According to the present invention recited according to the fifth aspect, because of inclusion of the second housing groove part which houses the pressure crimping member in the lid part, the pressure crimping member can be easily restrained from moving in conjunction with the optical fiber in a case where an external force which pulls out the optical fiber from the housing is applied, so that movement of the optical fiber can be further suppressed.

According to the present invention according to the sixth aspect, even if an error is caused in a position of the pressure crimping member at the time of assembly, it is possible to house the pressure crimping member in the second housing groove part while coping with such an error, because the pressure crimping member is movable in a lengthwise direction of the optical fiber within the second housing groove part.

According to the present invention according to the seventh aspect, because of inclusion of the movement restraining part in at least one of the housing and the lid part, movement of the optical fiber is suppressed in a case where an external force which pulls out the optical fiber from the housing is applied, which makes it difficult for the connection end part to go away from a mating optical fiber. Thus, efficiency in communication with a mating optical connector can be improved.

According to the present invention according to the eighth aspect, by bringing the protrusion part into contact with an outer surface of the optical fiber, it is possible to effectively suppress movement of the optical fiber. Also, the protrusion part is preferably formed integrally with the housing or the lid part, and such configuration can reduce the number of parts.

According to the present invention according to the ninth aspect, as a result of the optical fiber being sandwiched between the plate-shaped pressure crimping member and the elastic member, movement of the optical fiber can be effectively suppressed by utilizing a friction force caused between the elastic member and the optical fiber. Also, it is preferable that the elastic member is provided in the lid part, the pressure crimping member is provided in the facing surface part of the housing, which faces the opening part, and the facing surface part is a bottom surface part of the housing. As a result of such configuration, the optical fiber can be pressed by the elastic member with the use of a weight of the lid part, so that movement of the optical fiber can be more effectively suppressed.

According to the present invention according to the tenth aspect, by bringing a tip end of the elastic member in a tapering shape into contact with the optical fiber, a pressure applied to the optical fiber by the elastic member can be improved, so that movement of the optical fiber can be further suppressed.

According to the present invention according to the eleventh aspect, because of inclusion of irregularities in a surface of the elastic member, which faces the optical fiber, a pressure applied to the optical fiber by the elastic member can be improved with a protruding part being brought into contact with the optical fiber. As a result, movement of the optical fiber can be further suppressed.

According to the present invention according to the twelfth aspect, the retreat restraining part which can come into contact with the crimping member crimped onto an outer surface of the optical fiber, from a base side, is provided in at least one of the housing and the lid part, which makes it difficult for the connection end part to go away from a mating optical fiber in a case where an external force which pulls out the optical fiber from the housing is applied. As a result, efficiency in communication with a mating optical connector can be improved. Also, since the housing groove part comes into contact with plural side surfaces of the crimping member in a shape of a polygonal column, the optical fiber is restrained from rotating about a lengthwise direction as a rotation axis. This can prevent poor connection with a mating connector.

BRIEF DESCRIPTION OF DRAWINGS

FIG. 5A is a sectional view showing a state in which a connection end part of the optical connector is housed in the housing;

FIG. 5B is a sectional view showing a state in which a connection end part of the optical connector is housed in the housing;

FIG. 10 is a perspective view showing a lid part of the optical connector;

FIG. 11A is a sectional view showing a state in which the lid part is attached to a housing of the optical connector;

FIG. 11B is a sectional view showing a state in which the lid part is attached to a housing of the optical connector;

FIG. 18 is a sectional view showing the housing and a connection end part of the optical connector;

FIG. 21 is a sectional view showing the optical connector and the mating optical connector;

DETAILED DESCRIPTION

Hereinafter, embodiments of the present invention will be described with reference to the drawings. It is noted that, in second to tenth embodiments, the same structural elements as those described in a first embodiment and structural elements having the same functions as those described in the first embodiment will be denoted by the same reference symbols as in the first embodiment, and description of such structural elements will be omitted.

First Embodiment

Figure 1:
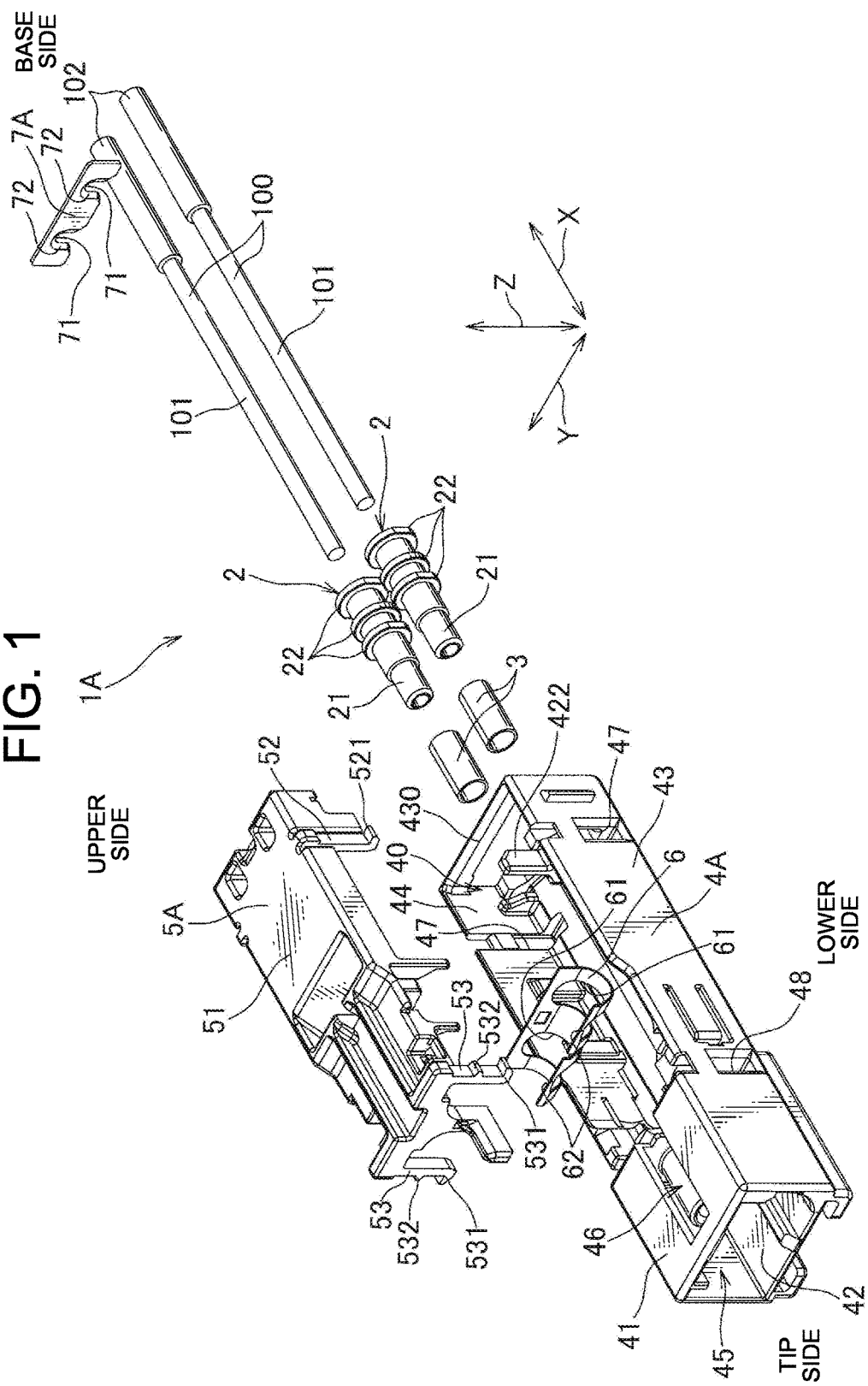
FIG. 1 is an exploded perspective view showing a whole structure of an optical connector according to a first embodiment of the present invention.
Figure 2:
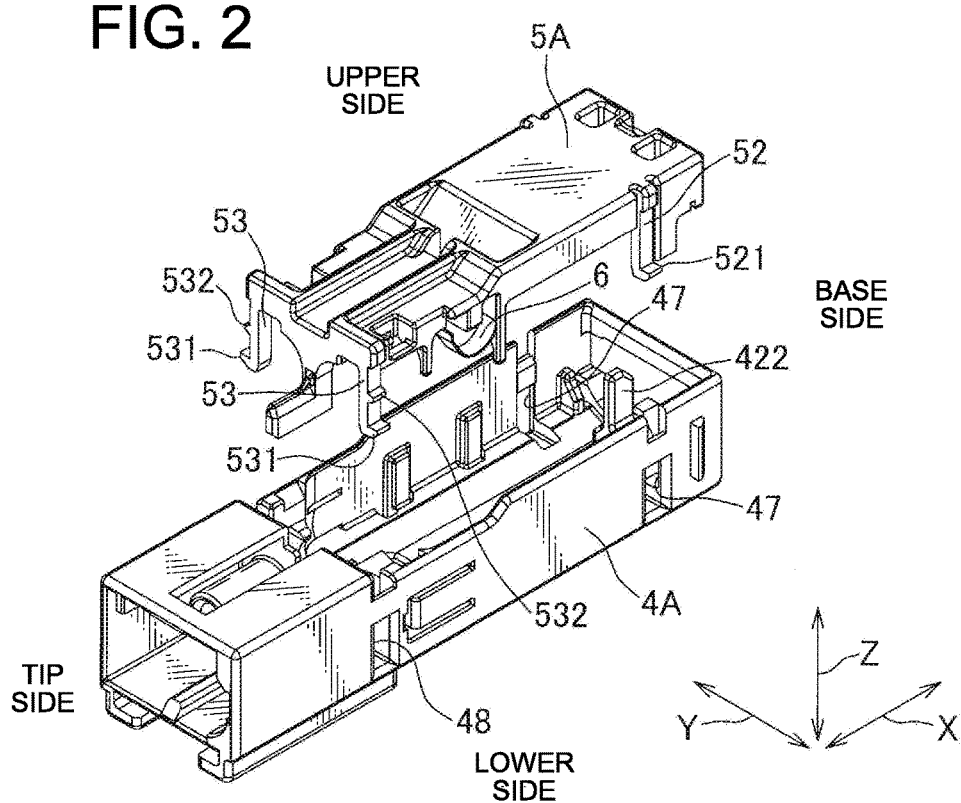
FIG. 2 is an exploded perspective view showing a housing and a lid part of the optical connector.
Figure 3:
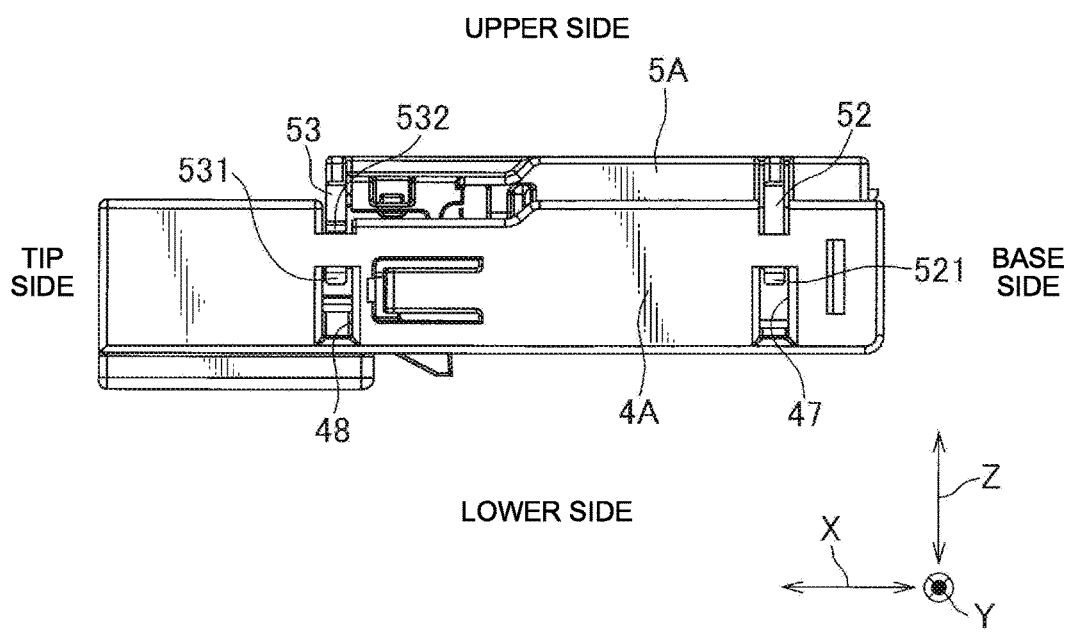
FIG. 3 is a side view showing the housing and the lid part.
Figure 4A:
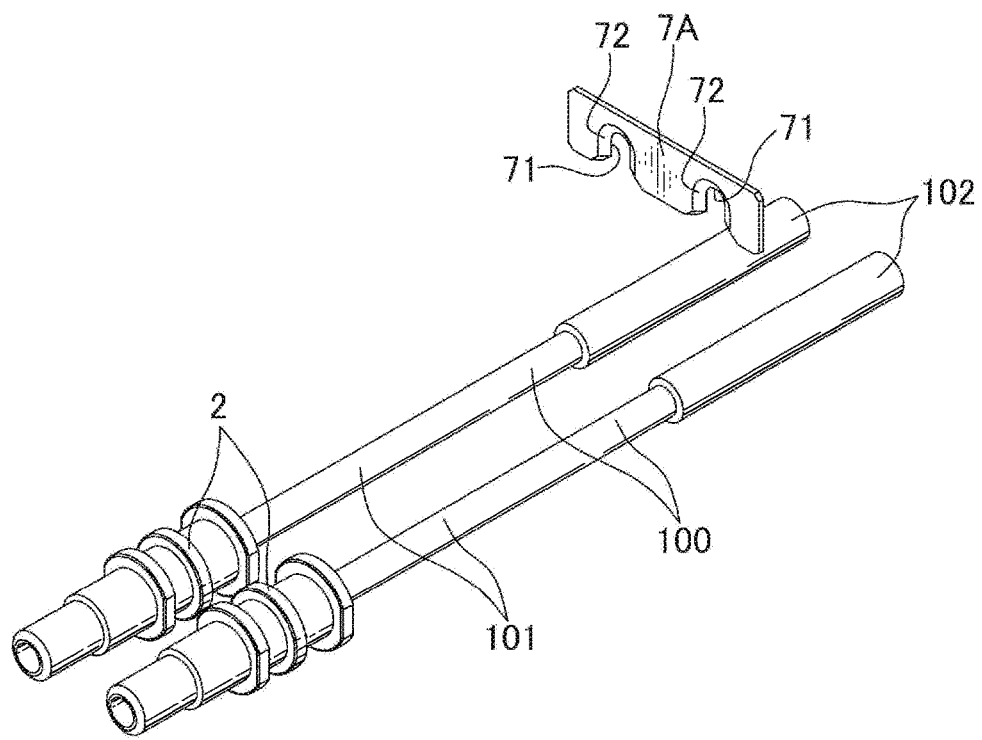
FIG. 4A is a perspective view showing a state in which a pressure crimping member of the optical connector is attached to an optical fiber.
Figure 4B:
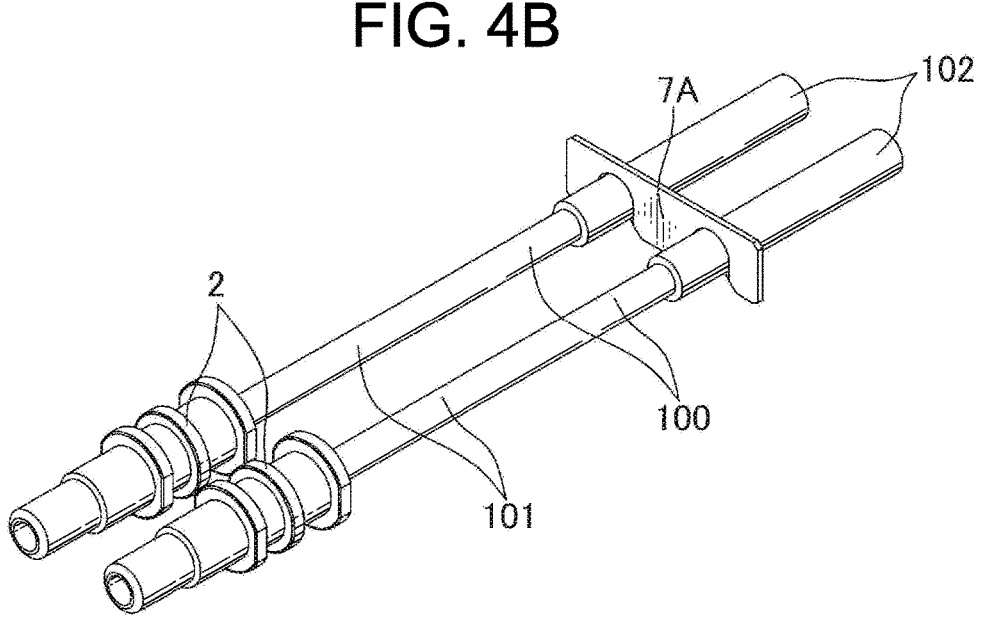
FIG. 4B is a perspective view showing a state in which a pressure crimping member of the optical connector is attached to an optical fiber.
Figure 6:
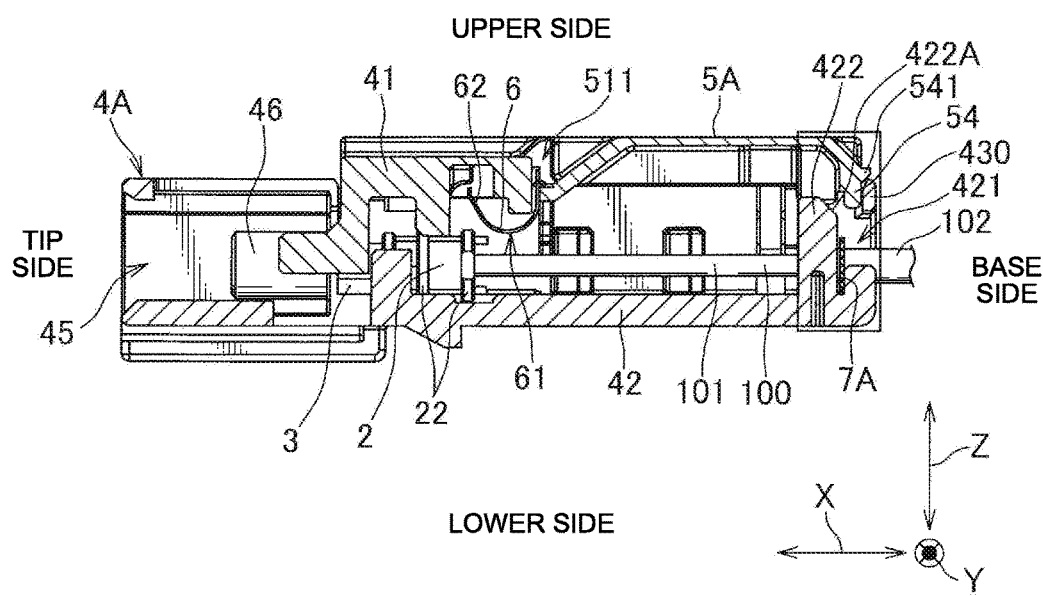
FIG. 6 is a sectional view showing a state in which the lid part is temporarily locked to the housing in which the connection end part is housed.
Figure 7:
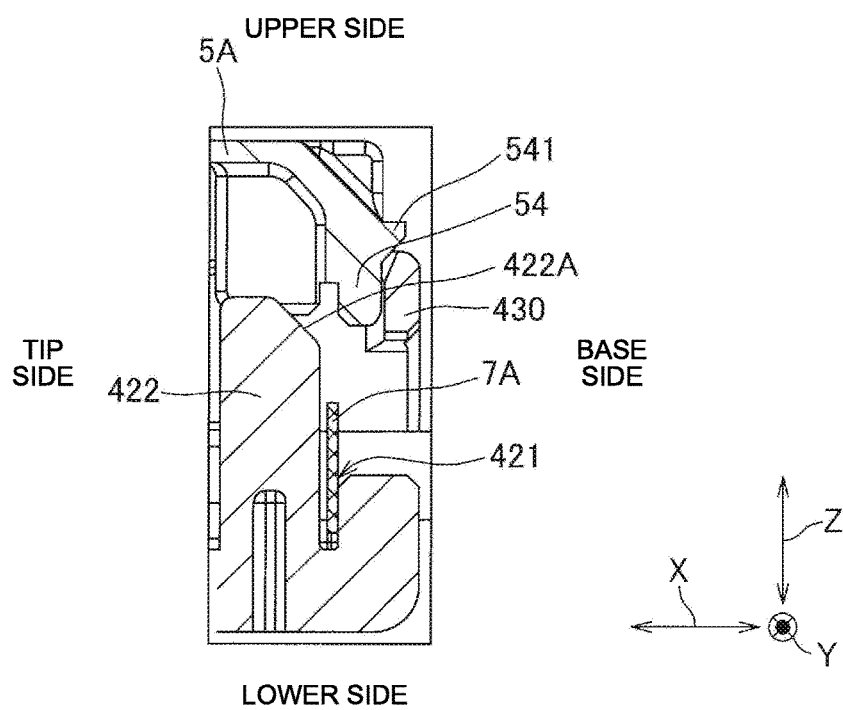
FIG. 7 is an enlarged sectional view showing principal parts of FIG. 6.
Figure 8:
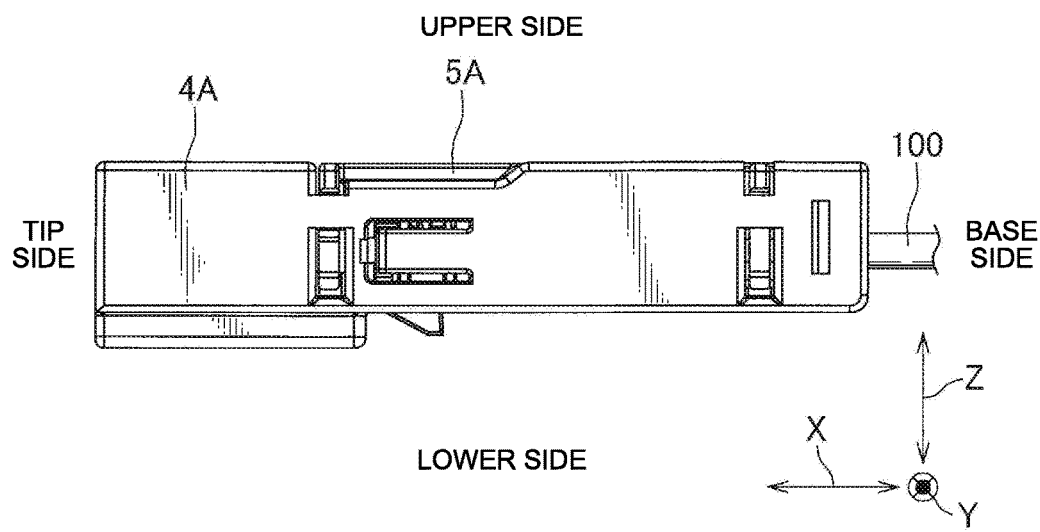
FIG. 8 is a sectional view showing a state in which the lid part is finally locked to the housing.

FIG. 1 is an exploded perspective view showing a whole structure of an optical connector according to the first embodiment of the present invention. FIG. 2 is an exploded perspective view showing a housing and a spacer serving as a lid part in the optical connector. FIG. 3 is a side view showing the housing and the spacer. FIG. 4A and FIG. 4B are perspective views showing a state in which a pressure crimping blade serving as a pressure crimping member of the optical connector is attached to optical fibers. FIG. 5A and FIG. 5B are sectional views showing a state in which ferrules serving as connection end parts of the optical connector are housed in the housing. FIG. 6 is a sectional view showing a state in which the spacer is temporarily locked to the housing in which the ferrules are housed. FIG. 7 is an enlarged sectional view showing principal parts of FIG. 6. FIG. 8 is a sectional view showing a state in which the spacer is finally locked to the housing.

As shown in FIG. 1, an optical connector 1A according to the first embodiment includes: ferrules 2 which are provided at respective tip ends of a pair of optical fibers 100, respectively, and serve as connection end parts; slit sleeves 3 provided at tip ends of the ferrules 2; a housing 4A which houses the ferrules 2; a spacer 5A which is attached to the housing 4A and serves as a lid part; a spring 6 for pressing the ferrules 2 against the housing 4A; and a pressure crimping blade 7A which is attached to the optical fibers 100 and serves as a pressure crimping member. Though the optical connector 1A according to the present embodiment is assumed to be a male connector and be connected with a mating optical connector which is a female optical connector not shown in the drawings, the optical connector 1A may be a female connector. Also, in the present embodiment, a lengthwise direction of the optical fibers 100 is defined as an X direction, a vertical direction is defined as a Z direction, and a direction which is approximately orthogonal to an X direction and a Z direction is defined as Y direction. Further, terms "a tip side" and "a base side" in the present embodiment are sides with respect to the optical fibers 100.

Out of the pair of optical fibers 100, one of them is used for transmission and the other is used for reception. The optical fibers 100 are aligned in a Y direction and communicate with optical fibers of a mating optical connector. Also, each of the optical fibers 100 includes a light guide part 101 formed of a core and a clad, and a cover part 102 formed of a resin or the like which is formed so as to cover an outer surface of the light guide part 101. A portion of the light guide part 101 on a tip side is not covered and is exposed.

The ferrules 2 are used for almost coaxially arranging the optical fibers 100 and mating optical fibers and connecting those fibers. The ferrules 2 are attached to the exposed portions of the light guide parts 101, and each of the ferrules 2 includes a connection part 21 which is formed in a tip-end portion and has a cylindrical shape, and a plurality of flange parts 22 which are formed in an outer surface and are shaped like rings.

The slit sleeves 3 are attached so as to cover outer surfaces of the connection parts 21 of the ferrules 2. Also, the slit sleeves 3 are configured so as to connect ferrules with each other by covering respective outer surfaces of the ferrules when the optical connector 1A and a mating optical connector are connected with each other.

The housing 4A is formed of a synthetic resin, for example, includes a top surface part 41, a bottom surface part 42, and a pair of side surface parts 43 and 44, and is formed in a shape of a rectangular cylinder extending in an X direction. On a tip side of the housing 4A, a connector housing part 45 which has a concave shape and houses a mating connector, and tip-end housing parts 46 each of which has a cylindrical shape, and places and houses a tip end of the ferrule 2 and the slit sleeve 3 in the connector housing part 45, are formed. An opening part 40 is formed from a central portion of the top surface part 41 to an end portion on a base side, and the bottom surface part 42 which faces the opening part 40 is a facing surface part. Also, a coupling locking part 430 which extends in a Y direction and couples the pair of side surface parts 43 and 44 is formed between the pair of side surface parts 43 and 44 on a base side and in an upper end portion in a Z direction.

As particularly shown in FIGS. 5A to 7, in the bottom surface part 42, there are formed: three first housing groove parts 421 which are open to an upper side in a Z direction (a side where the top surface part 41 is provided), to house the pressure crimping blade 7A, and are aligned in a Y direction; and a stopper wall part 422 which forms a wall on a tip side in a central one of the first housing groove parts 421. The stopper wall part 422 is erected from the bottom surface part 42 so as to be high enough to come into contact with a lower surface of the spacer 5A when the spacer 5A is mounted in the housing 4A. Also, the stopper wall part 422 includes an inclined guide part 422A which is inclined downward as a distance to a base end decreases, in a portion close to base ends of the optical fibers 100. Further, as shown in FIGS. 5A and 5B, the stopper wall part 422 is placed between respective positions where the pair of optical fibers 100 are provided, and is configured so as to less seriously interfere with the optical fibers 100 and come into contact with a central portion in a Y direction of the pressure crimping blade 7A attached to the optical fibers 100, which will be later described.

In the pair of side surface parts 43 and 44, locking holes 47 and 48 which lock locking pieces 521, 531, and 532 of the spacer 5A which will be later described, are formed.

The spacer 5A is formed of a synthetic resin, for example, and includes: a lid plate part 51 which is plate-shaped, has almost the same dimension as the opening part 40, and blocks the opening part 40; a pair of temporary locking pieces 52 and a pair of final locking pieces 53 which extend downward (toward the bottom surface part 42) from edges on opposite sides in a Y direction in the lid plate part 51; and a base-end wall part 54 which extends downward from an edge on a base side of the lid plate part 51. The temporary locking pieces 52 and the final locking pieces 53 have almost the same dimension in a Z direction. At tip ends of the temporary locking pieces 52 and the final locking pieces 53, temporary locking protrusions 521 and 531 which protrude toward an outside in a Y direction are formed, respectively. Also, in an approximately central portion in a Z direction of each of the final locking pieces 53, a final locking protrusion 532 which protrudes toward an outside in a Y direction is formed. It is noted that a term "an outside in a Y direction" means an outside with respect to an inside of the housing 4A. Also, in the base-end wall part 54, a base-end locking protrusion 541 which protrudes toward a base end and is locked to the coupling locking part 430 is formed.

In bringing the spacer 5A close to the housing 4A to mount the spacer 5A in the housing 4A, first, the temporary locking protrusions 521 and 531 come into contact with the side surface parts 43 and 44, and the temporary locking pieces 52 and the final locking pieces 53 bend toward an inside in a Y direction. As the spacer 5A is brought closer to the housing 4A, the temporary locking protrusions 521 enter into the locking holes 47 and the temporary locking protrusions 531 enter into the locking holes 48. Then, the temporary locking pieces 52 and the final locking pieces 53 are restored, so that the spacer 5A is temporarily locked to the housing 4A. As the spacer 5A is brought further closer to the housing 4A, the final locking protrusions 532 come into contact with the side surface parts 43 and 44, and the final locking pieces 53 bend toward an inside in a Y direction. Thereafter, the final locking protrusions 532 enter into the locking holes 47, and the final locking pieces 53 are restored. At almost the same time, the base-end locking protrusion 541 is locked to the coupling locking part 430. In the above-described manner, the spacer 5A is finally locked to the housing 4A.

As shown in FIG. 6, the lid plate part 51 includes a spring holding part 511 which holds the spring 6. The spring holding part 511 is configured so as to hold an end portion on a base side of the spring 6 which is formed so as to have a U-shaped section as later described.

The spring 6 is formed by a process of bending or punching a sheet metal, for example, and is U-shaped as viewed from a Y direction. Also, in the spring 6, a hole 61 which extends in an X direction (and is in an oval shape having a major axis in an X direction before a process of bending) is formed, and a portion of the spring 6, which is closer to a tip end than the hole 61, serves as a pressing part 62. When the spring 6 is held by the spacer 5A, the pressing part 62 is a free end. Then, when the spacer 5A holding the spring 6 is attached to the housing 4A, the optical fibers 100 are placed in the hole 61, so that interference with the spring 6 is suppressed and the pressing part 62 comes into contact one of the flange parts 22 of each of the ferrules 2, which is located closest to a base end, resulting in deformation of the spring 6. Owing to a restoring force of the spring 6, the flange parts 22 are pressed toward a tip end, and the optical fibers 100 are urged to move toward a tip end.

The pressure crimping blade 7A is formed by a process of punching a sheet metal, for example, and includes U-shaped recess parts 71 which are open downward. An inner diameter of a hemispherical portion of each of the recess parts 71 is approximately equal to, or slightly smaller than, an outer diameter of the cover part 102 of the optical fiber 100. As a result of press-fit of the cover parts 102 in the recess parts 71, the optical fibers 100 are placed in the recess parts 71, and then the pressure crimping blade 7A is attached to the optical fibers 100. Also, the pressure crimping blade 7A includes blade parts 72 which are formed around the recess parts 71 so as to be thinner as a distance to the recess parts 71 decreases. Thus, and the blade parts 72 can be easily engaged in the cover parts 102.

Below, a method of assembling the optical connector 1A will be described. First, as shown in FIG. 2, after the spacer 5A is caused to hold the spring 6, the spacer 5A and the housing 4A are brought close to each other in a Z direction, and the spacer 5A is temporarily locked to the housing 4A as shown in FIG. 3. At that time, the base-end locking protrusion 541 of the spacer 5A is placed above the coupling locking part 430 as shown in FIG. 6. Subsequently, as shown in FIG. 4A, after the ferrules 2 are provided at tip ends of the optical fibers 100, the cover parts 102 are press-fitted into the recess parts 71 as shown in FIG. 4B, so that the pressure crimping blade 7A is attached to the optical fibers 100.

Subsequently, as shown in FIG. 5A, after the slit sleeves 3 are attached to the ferrules 2, the housing 4A and the optical fibers 100 are brought close to each other in an X direction, and the ferrules 2 are housed in the housing 4A in such a manner that the ferrules 2 penetrate through an opening on a base side in the housing 4A (i.e., an opening between the coupling locking part 430 and the bottom surface part 42). As shown in FIG. 5B, after the ferrules 2 and the slit sleeves 3 are housed in the tip-end housing parts 46, the pressure crimping blade 7A is moved downward, to be housed in the first housing groove parts 421. At that time, because of provision of the stopper wall part 422, the pressure crimping blade 7A is restrained from climbing over the stopper wall part 422 and moving to a position which is closer to a tip end than the first housing groove parts 421.

Subsequently, the housing 4A and the spacer 5A, which are being in a state shown in FIGS. 6 and 7, are further brought close to each other in a Z direction, so that the spacer 5A is finally locked to the housing 4A as shown in FIG. 8. At that time, the spring 6 comes into contact with the ferrules 2, and presses the ferrules 2 toward a tip end. Further, because of inclusion of the inclined guide part 422A in the stopper wall part 422, even if the spacer 5A is displaced toward a tip end with respect to the housing 4A, such displacement can be canceled when the base-end wall part 54 of the spacer 5A comes into contact with the inclined guide part 422A and is guided toward a base end. Also, when the spacer 5A is finally locked to the housing 4A, the cover parts 102 of the optical fibers 100 are sandwiched and pressed between the pressure crimping blade 7A and the bottom surface part 42 in a Z direction. Then, when the spacer 5A is finally locked to the housing 4A in the above-described manner, assembly of the optical connector 1A is completed, so that the optical connector 1A becomes connectable with a mating optical connector.

The above-described present embodiment would produce the following effects. Specifically, as a result of the cover parts 102 being sandwiched and pressed between the pressure crimping blade 7A and the bottom surface part 42, movement of the optical fibers 100 is suppressed by a pressing force in a case where an external force which pulls out the optical fibers 100 from the housing 4A is applied, which makes it difficult for the ferrules 2 to go away from mating optical fibers. This can improve efficiency in communication with a mating optical connector.

Moreover, because of inclusion of the first housing groove parts 421 which house the pressure crimping blade 7A in the housing 4A, movement of the optical fibers 100 can be further suppressed in a case where an external force which pulls out the optical fibers 100 from the housing 4A is applied. Also, because of inclusion of the stopper wall part 422 in the housing 4A, the pressure crimping blade 7A is restrained from moving toward a tip end. This prevents the pressure crimping blade 7A which may possibly be placed in a position closer to a tip end than the first housing groove parts 421 due to deflection of the optical fibers 100, from being placed in such a position. This can improve mountability of the spacer 5A in the housing 4A.

Second Embodiment

Figure 9:
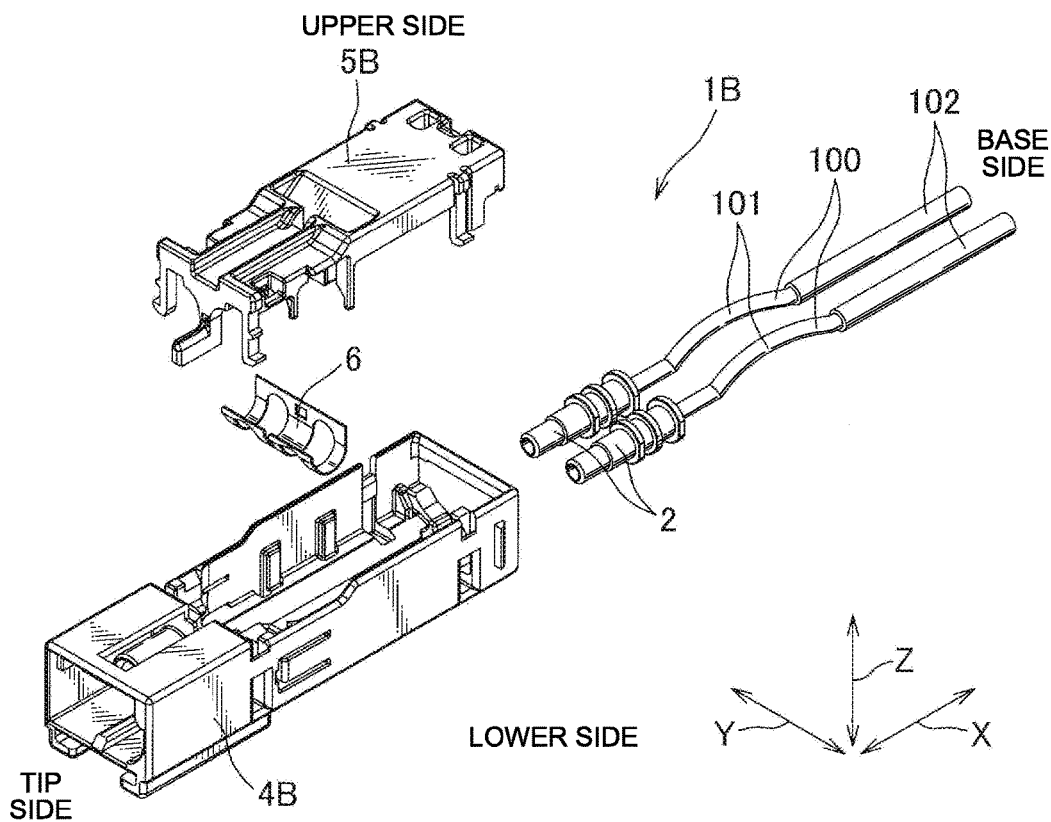
FIG. 9 is an exploded perspective view showing a whole structure of an optical connector according to a second embodiment of the present invention.
Figure 12A:
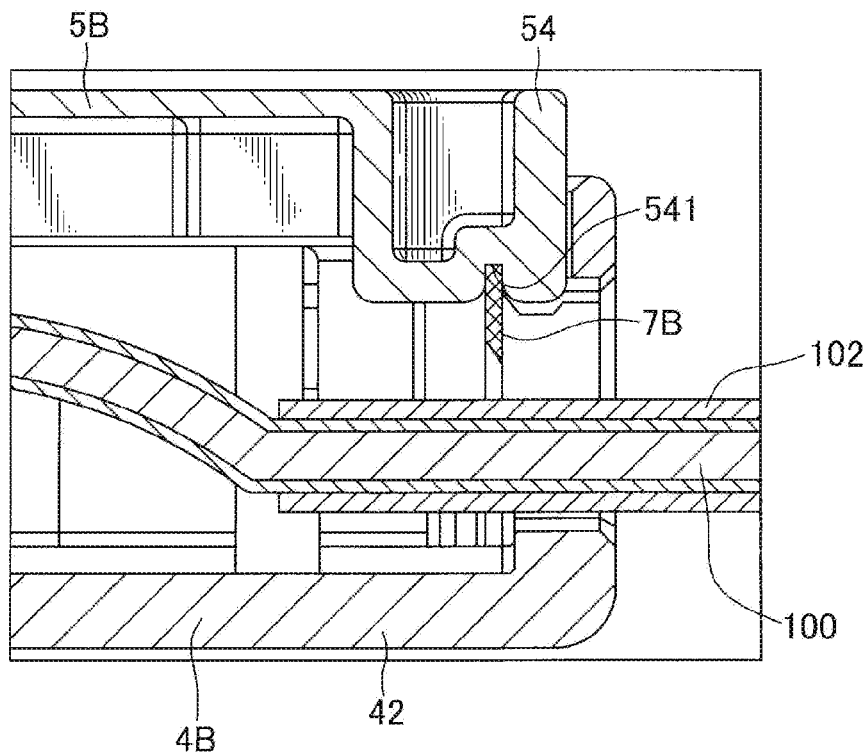
FIG. 12A is an enlarged sectional view showing principal parts of FIG. 11A.
Figure 12B:
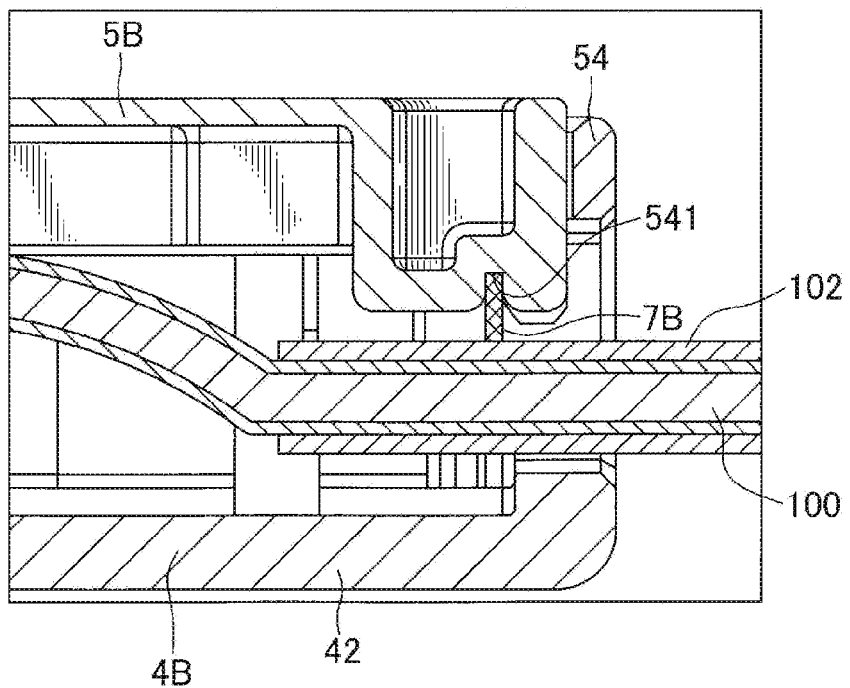
FIG. 12B is an enlarged sectional view showing principal parts of FIG. 11B.

FIG. 9 is an exploded perspective view showing a whole structure of an optical connector 1B according to a second embodiment of the present invention. FIG. 10 is a perspective view showing a spacer 5B of the optical connector 1B. FIGS. 11A and 11B are sectional views showing a state in which the spacer 5B is attached to a housing 4B of the optical connector 1B. FIGS. 12A and 12B are enlarged sectional views showing principal parts of FIGS. 11A and 11B.

The optical connector 1B according to the second embodiment includes the ferrules 2, the housing 4B, the spacer 5B, and the spring 6, and a pressure crimping blade 7B, as shown in FIGS. 9 and 10. In the present embodiment, though the light guide parts 101 of the optical fibers 100 to which the ferrules 2 are attached, are assumed to be convexly curved upward, the light guide parts 101 are not necessarily curved and may extend in a straight line. Also, the optical connector 1B may include slit sleeves in the same manner as in the above-described first embodiment.

The pressure crimping blade 7B is formed integrally with a base-end wall part 54 of the spacer 5B. More specifically, a groove 542 is formed in a lower end surface of the base-end wall part 54, and the pressure crimping blade 7B is formed integrally with the spacer 5B in such a manner that a portion of the pressure crimping blade 7B, which is in the vicinity of an upper edge (a portion on a side opposite to the recess parts 71), is buried in the groove 542. It is noted that though a portion of the pressure crimping blade 7B, which surrounds the recess parts 71, is assumed to have an approximately uniform thickness, the blade part 72 may be formed in the same manner as in the above-described first embodiment.

Below, a method of assembling the optical connector 1B will be described. First, similarly to the above-described first embodiment, the spacer 5B holding the spring 6 is temporarily locked to the housing 4B, and the optical fibers 100 to which the ferrules 2 are attached are inserted into the housing 4B. Subsequently, as shown in FIGS. 11A, 11B, 12A, and 12B, the spacer 5B and the housing 4B are brought close to each other, and the spacer 5B is finally locked to the housing 4B. At that time, the cover parts 102 of the optical fibers 100 are sandwiched and pressed between the pressure crimping blade 7B and the bottom surface part 42.

The above-described present embodiment would produce the following effects. Specifically, as a result of the pressure crimping blade 7B being formed integrally with the spacer 5B, the number of parts can be reduced, and mountability can be further improved.

Third Embodiment

Figure 13:
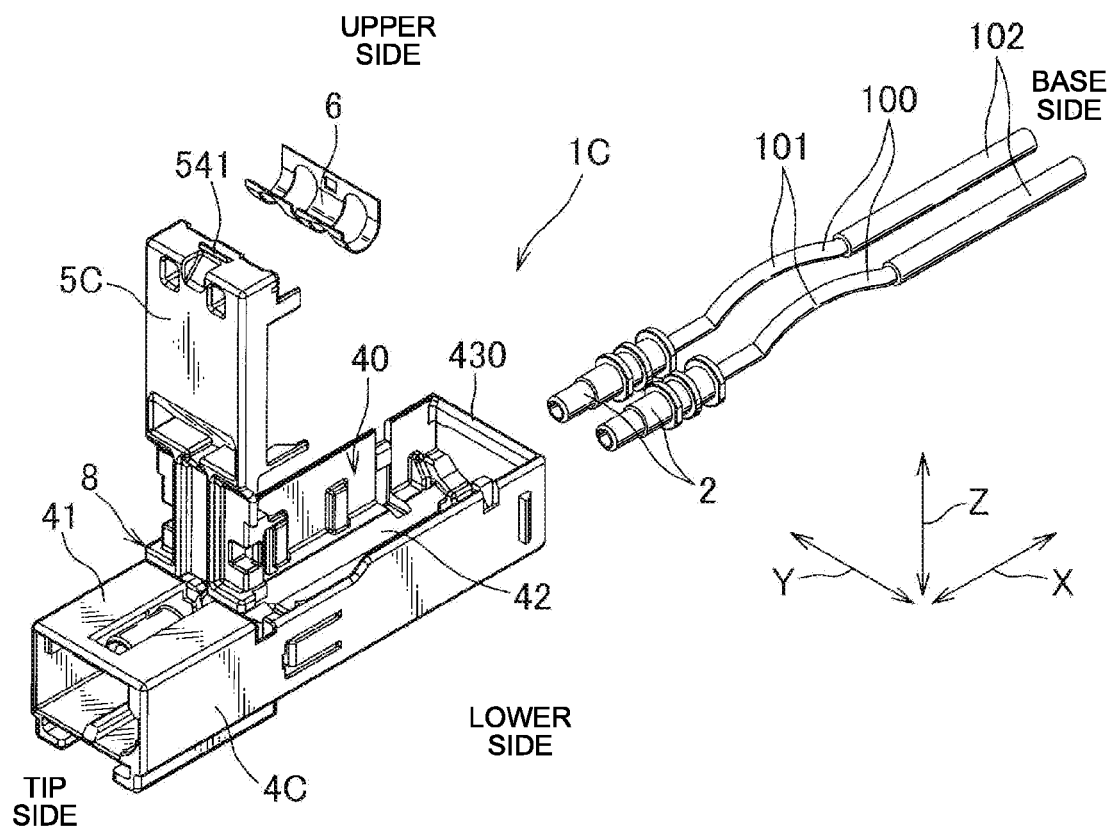
FIG. 13 is an exploded perspective view showing a whole structure of an optical connector according to a third embodiment of the present invention.

FIG. 13 is an exploded perspective view showing a whole structure of an optical connector 1C according to a third embodiment of the present invention. The optical connector 1C according to the third embodiment includes the ferrules 2, a housing 4C, a spacer 5C, the spring 6, and a pressure crimping blade not shown in the drawings. In the optical connector 1C, the pressure crimping blade is formed integrally with the spacer 5C in the same manner as in the above-described second embodiment.

The housing 4C and the spacer 5C are connected with each other via a hinge 8. The hinge 8 is provided on a side of the top surface part 41, where the opening part 40 is provided, and is provided on a tip side of the spacer 5C. Thus, a tip side of the spacer 5C is pivotally supported by the housing 4C while a base side of the spacer 5C is a free end. Also, the pressure crimping blade, like the pressure crimping blade 7B of the above-described second embodiment, is provided on a base side of the spacer 5C.

In the present embodiment, though it is assumed that a locking hole is omitted in the housing 4C and a final locking piece or a temporary locking piece is omitted in the spacer 5C, a locking piece or a locking hole which locks a locking piece may be formed in the same manner as in the above-described first and second embodiments. In such a case, a locking hole is preferably formed in a shape of an arc which is centered on the hinge 8.

Below, a method of assembling the optical connector 1C will be described. First, similarly to the above-described first embodiment, the spring 6 is held by the spacer 5C, and the optical fibers 100 to which the ferrules 2 are attached are inserted into the housing 4C. Subsequently, the spacer 5C is turned so that a free end of the spacer 5C gets near to a base side of the housing 4C, and the base-end locking protrusion 541 is locked to the coupling locking part 430. As a result, the spacer 5C is finally locked to the housing 4C. At that time, the cover parts 102 of the optical fibers 100 are sandwiched and pressed between the pressure crimping blade and the bottom surface part 42.

The above-described present embodiment would produce the following effects. Specifically, as a result of the spacer 5C being pivotally supported by the housing 4C, it is possible to mount the spacer 5C in the housing 4C by turning the spacer 5C, so that mountability can be further improved.

Fourth Embodiment

Figure 14:
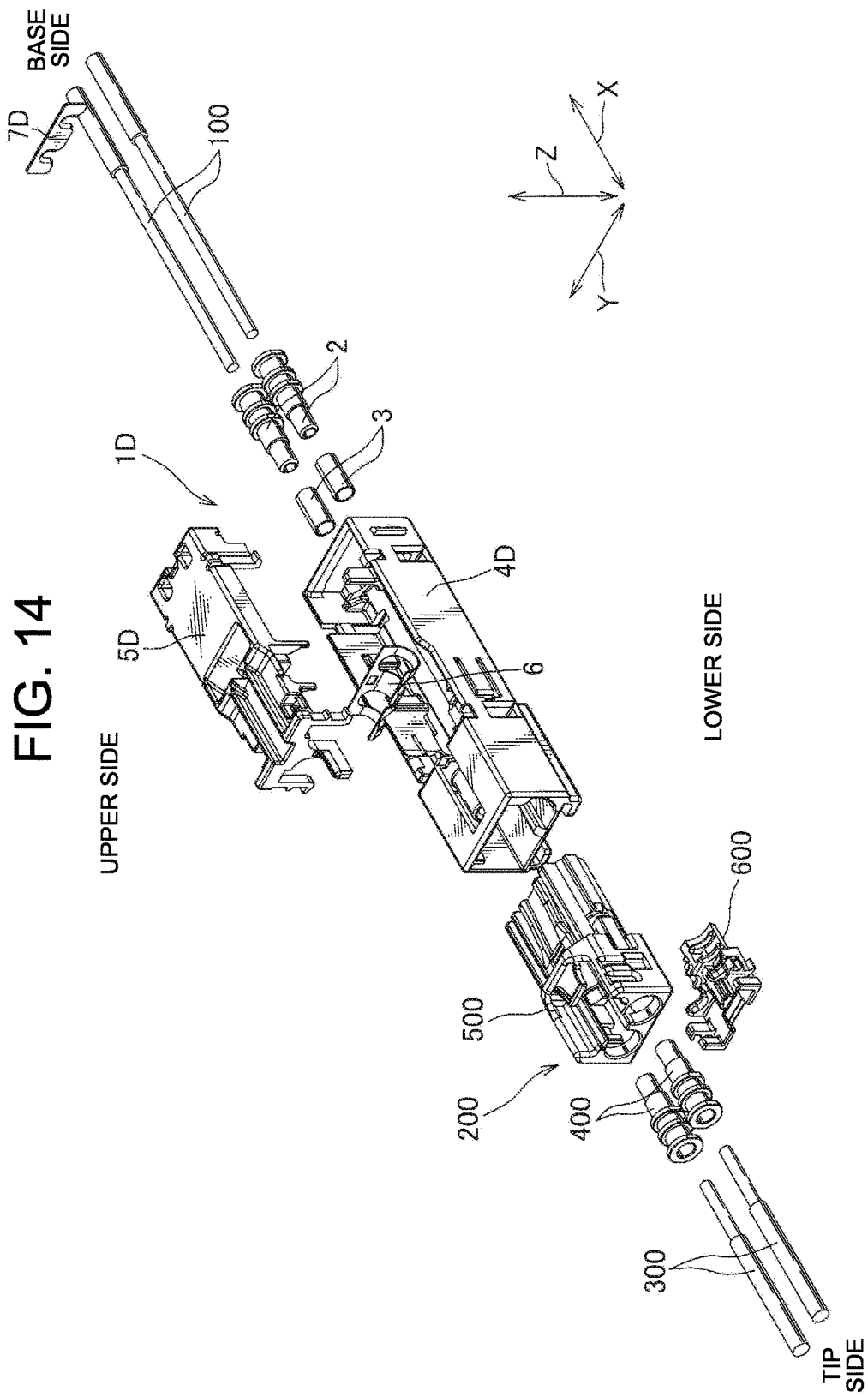
FIG. 14 is an exploded perspective view showing a whole structure of an optical connector according to a fourth embodiment of the present invention.
Figure 15:
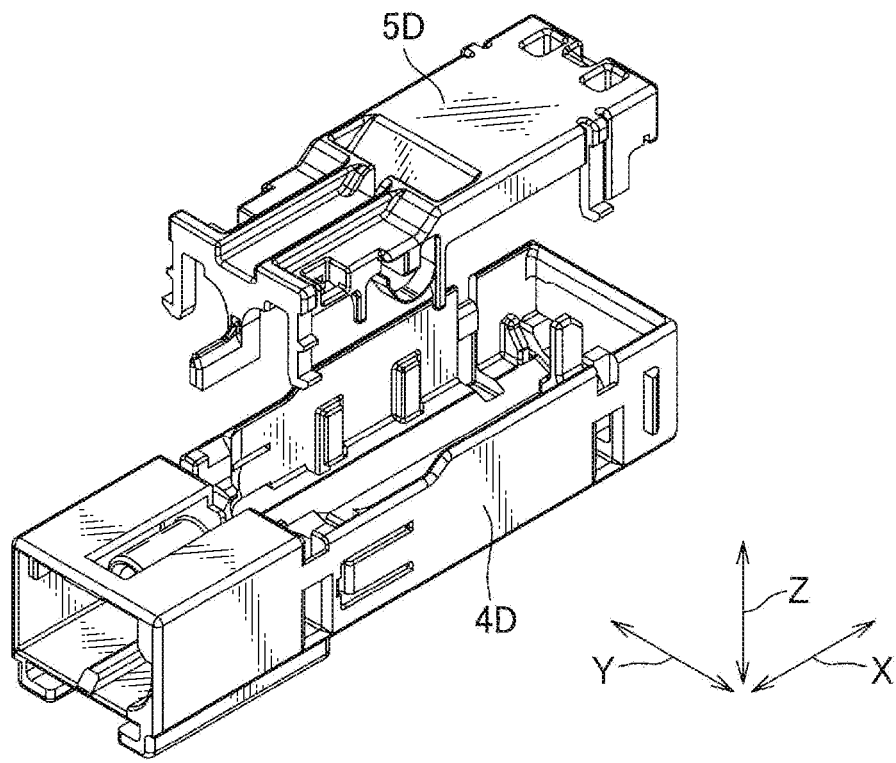
FIG. 15 is an exploded perspective view showing a housing and a lid part of the optical connector.
Figure 16:
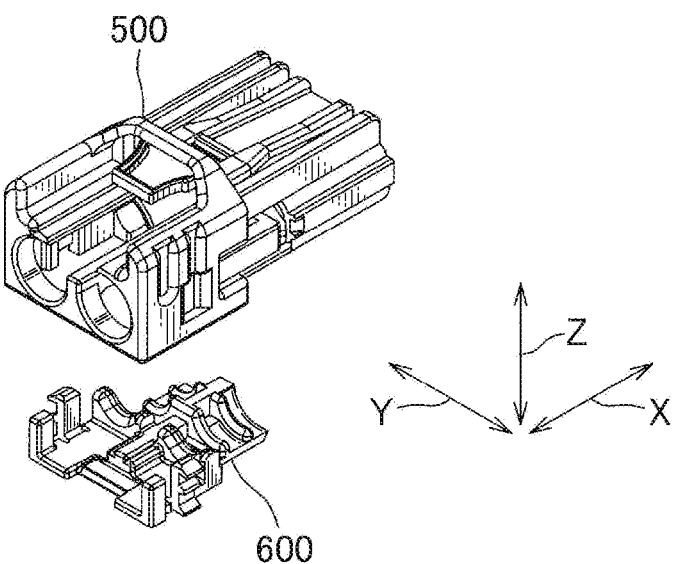
FIG. 16 is an exploded perspective view showing a housing and a lid part of a mating optical connector.
Figure 17A:
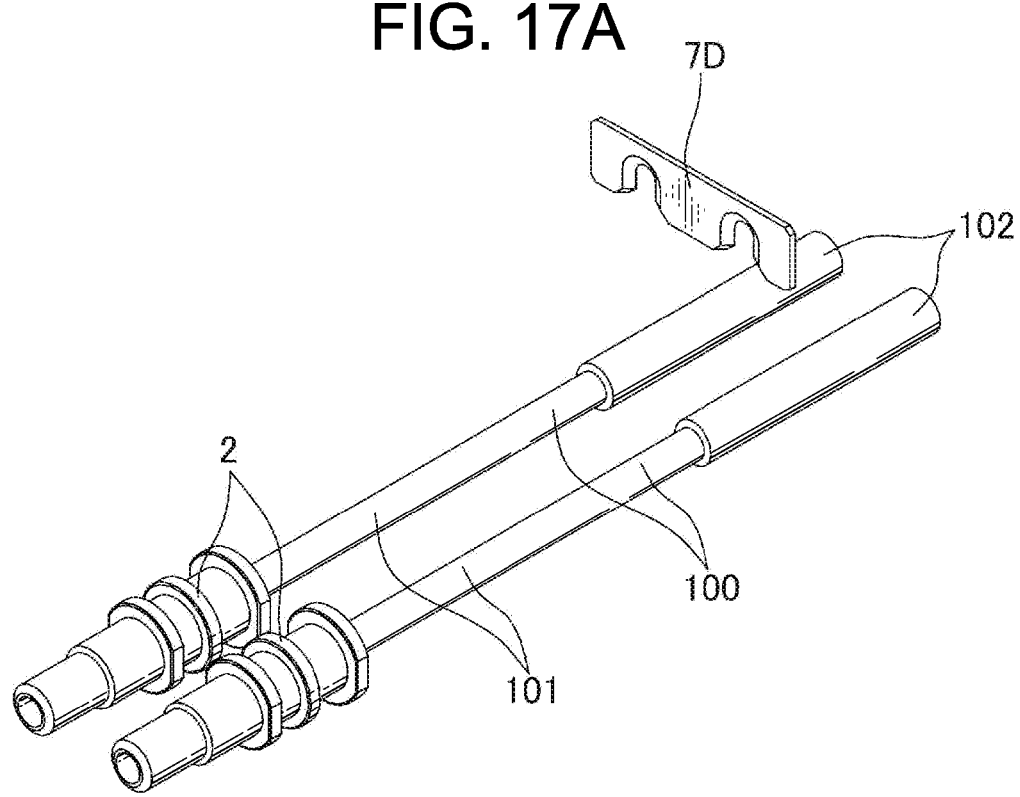
FIG. 17A is a perspective view showing a state in which a pressure crimping member of the optical connector is attached to an optical fiber.
Figure 17B:
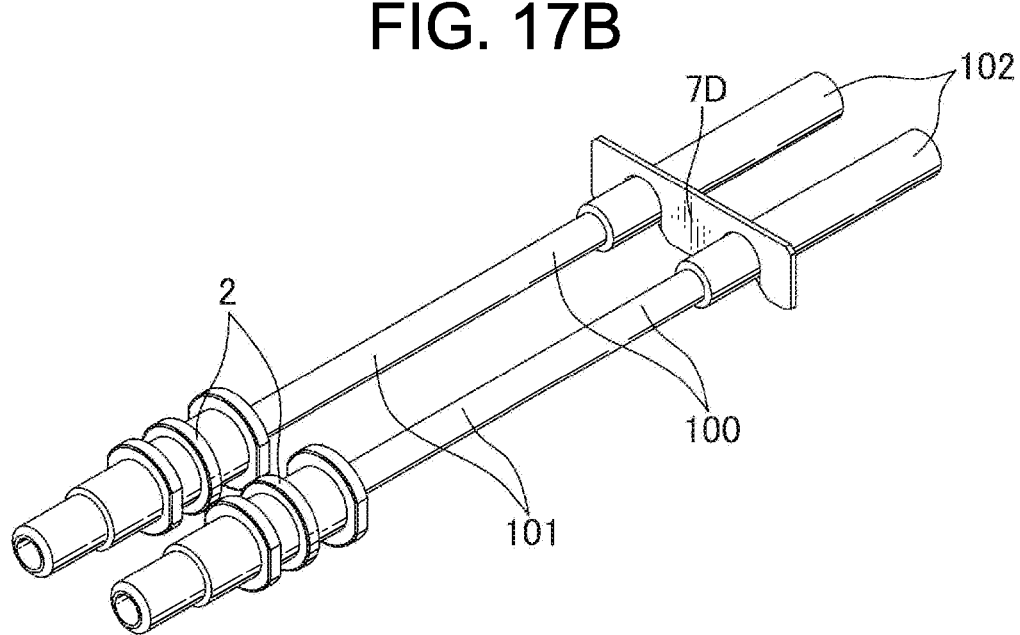
FIG. 17B is a perspective view showing a state in which a pressure crimping member of the optical connector is attached to an optical fiber.
Figure 19:
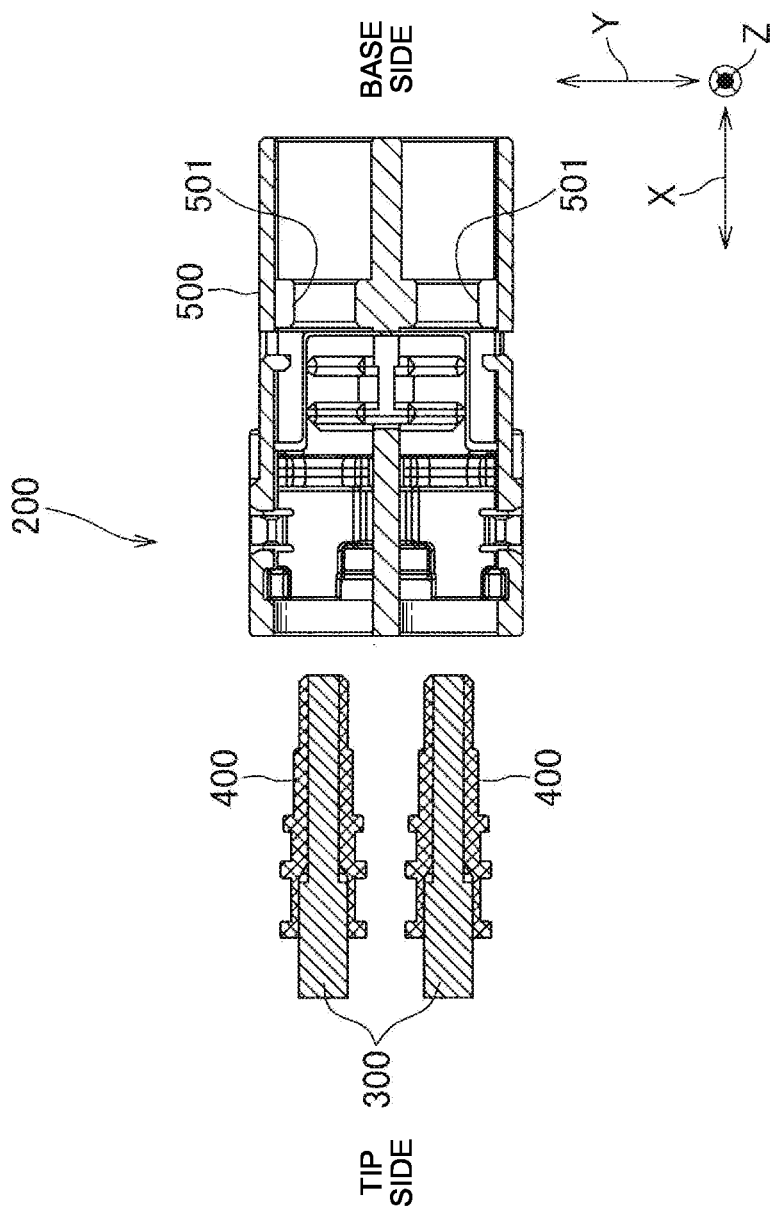
FIG. 19 is a sectional view showing a housing and a connection end part of the mating optical connector.
Figure 20:
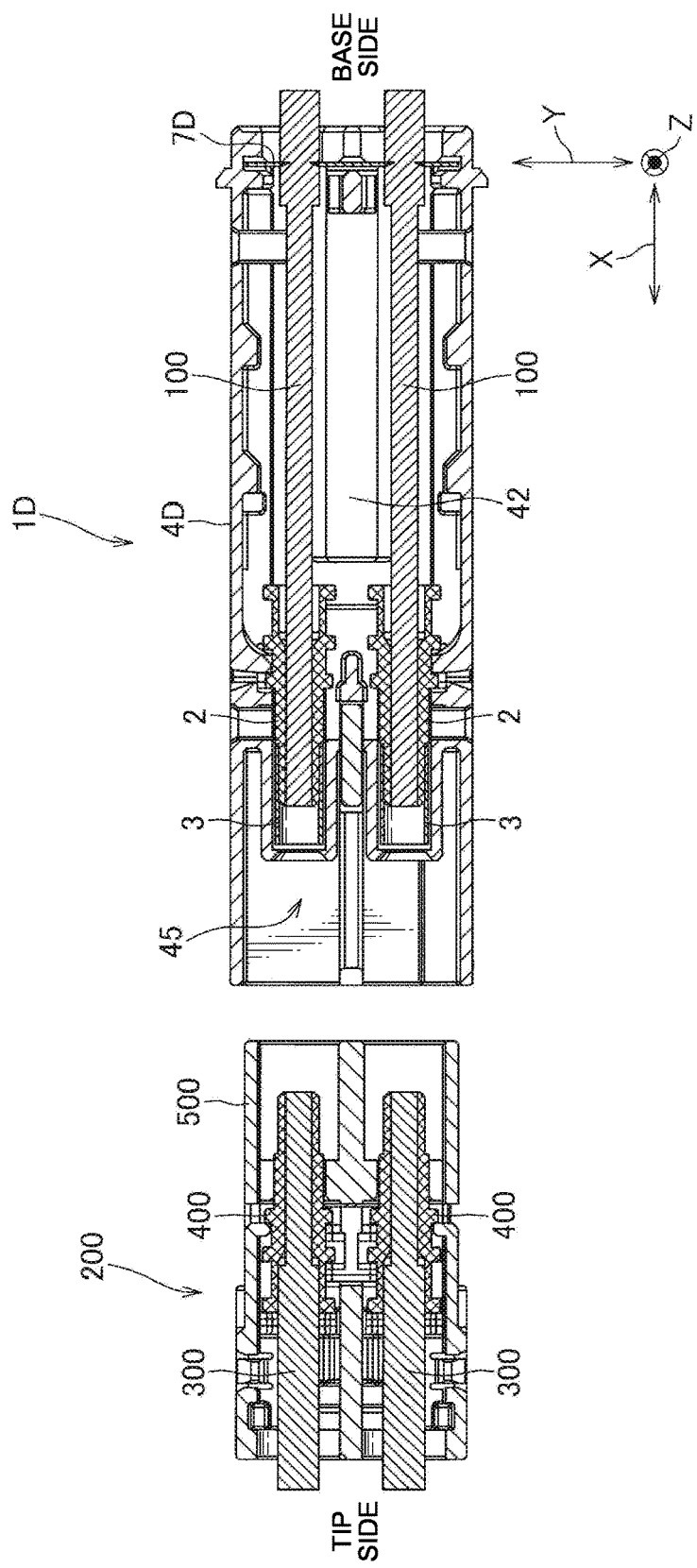
FIG. 20 is a sectional view showing the optical connector and the mating optical connector.
Figure 22:
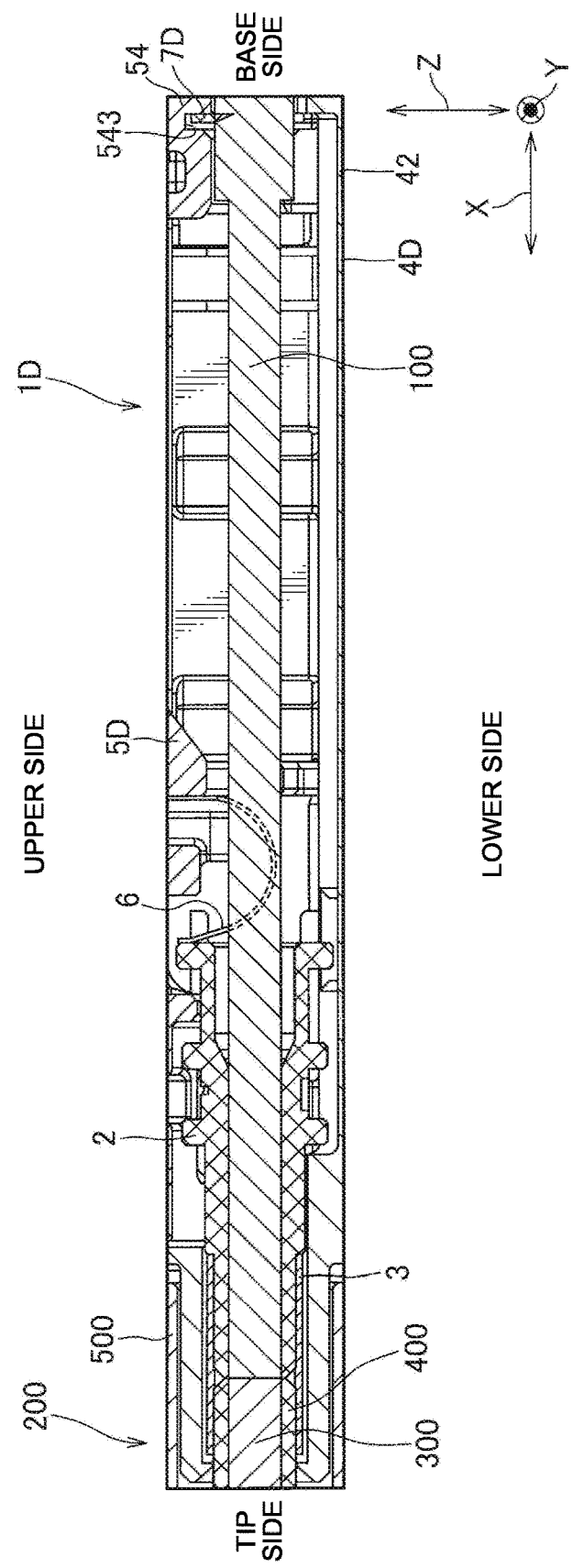
FIG. 22 is a sectional view showing a state in which the optical connector and the mating optical connector are connected with each other.

FIG. 14 is an exploded perspective view showing a whole structure of an optical connector 1D according to a fourth embodiment of the present invention. FIG. 15 is an exploded perspective view showing a housing 4D and a spacer 5D of the optical connector 1D. FIG. 16 is an exploded perspective view showing a housing 500 and a spacer 600 of a mating optical connector 200. FIGS. 17A and 17B are perspective views showing a state in which a pressure crimping blade 7D of the optical connector 1D is attached to the optical fibers 100. FIG. 18 is a sectional view showing the housing 4D and the ferrules 2 of the optical connector 1D. FIG. 19 is a sectional view showing the housing 500 and ferrules 400 of the optical connectors 200. FIG. 20 is a sectional view showing the optical connector 1D and the optical connector 200. FIG. 21 is a sectional view showing a state in which the optical connector 1D and the optical connector 200 are about to be fitted into each other. FIG. 22 is a sectional view showing a state in which the optical connector 1D and the optical connector 200 are fitted into each other.

The optical connector 1D according to the fourth embodiment includes the ferrules 2, the slit sleeves 3, the housing 4D, the spacer 5D, the spring 6, and the pressure crimping blade 7D. The mating optical connector 200 which is to be connected with the optical connector 1D includes: the ferrules 400 provided at tip ends of a pair of mating optical fibers 300; the housing 500 in which the ferrules 400 are housed and an opening part is formed in a bottom surface; and the spacer 600 which is attached to the housing 500 so as to cover the opening part. It is noted that terms "a tip side" and "a base side" in the present embodiment are sides with respect to the optical fibers 100 of the optical connector 1D.

As shown in FIGS. 21 and 22, in a lower surface of the base-end wall part 54 of the spacer 5D, a second housing groove part 543 which houses the pressure crimping blade 7D is formed. The second housing groove part 543 houses an upper end of the pressure crimping blade 7D, in other words, a portion of the pressure crimping blade 7D, which is opposite to the recess parts 71. Also, the second housing groove part 543 is formed so as to have a width (a dimension in an X direction) which is approximately equal to, or slightly larger than, a thickness of the pressure crimping blade 7D.

Below, a method of assembling the optical connector 1D and the optical connector 200 and connecting those connectors will be described. First, in assembling the optical connector 1D, the housing 4D and the spacer 5D are brought close to each other in a Z direction, and the spacer 5D is temporarily locked to the housing 4D. Thus, the ferrules 2 are provided at tip ends of the optical fibers 100, and the pressure crimping blade 7D is attached. Further, the slit sleeves 3 are attached to the ferrules 2, and the optical fibers 100 and the housing 4D are brought close to each other in an X direction as shown in FIG. 18, and the ferrules 2 and the slit sleeves 3 are housed in the tip-end housing parts 46 of the housing 4D. Thereafter, the housing 4D and the spacer 5D are brought closer to each other, and the spacer 5D is finally locked to the housing 4D. At that time, the cover parts 102 of the optical fibers 100 are sandwiched and pressed between the pressure crimping blade 7D and the bottom surface part 42.

On the other hand, in assembling the mating optical connector 200, the housing 500 and the spacer 600 are brought close to each other in a Z direction so that the spacer 600 is mounted in the housing 500, and the ferrules 400 are provided at tip ends of the optical fibers 300. Further, as shown in FIG. 19, the optical fibers 300 and the housing 500 are brought close to each other in an X direction, and the ferrules 400 are housed in housing parts 501 of the housing 500. Additionally, each of the housing parts 501 is formed in a cylindrical shape, and the ferrules 400 are inserted into the housing parts 501 to penetrate through the housing parts 501 in such a manner that tip ends of the ferrules 400 are exposed.

Subsequently, the optical connector 1D and the optical connector 200 which are assembled in the above-described manners are connected with each other. Specifically, as shown in FIGS. 20 and 21, the optical connector 1D and the optical connector 200 are brought close to each other, and the optical connector 200 is housed in the connector housing part 45 so that the optical connector 1D and the optical connector 200 are fitted into each other as shown in FIG. 22. At that time, tip ends of the ferrules 400 are covered with the slit sleeves 3, and respective end surfaces of the optical fibers 100 and the optical fibers 300 come into contact with each other.

The optical connector 1D and the optical connector 200 are assembled and connected with each other in the above-described manners. Since the cover parts 102 of the optical fibers 100 are sandwiched and pressed between the pressure crimping blade 7D and the bottom surface part 42, respective end surfaces of the optical fibers 100 and the optical fibers 300 can be easily kept in contact with each other even if the optical fibers 100 are pulled toward a base end.

The above-described present embodiment would produce the following effects. Specifically, because of inclusion of the second housing groove part 543 which houses the pressure crimping blade 7D in the spacer 5D, the pressure crimping blade 7D can be easily restrained from moving in conjunction with the optical fibers 100 in a case where an external force which pulls out the optical fibers 100 from the housing 4D is applied, so that movement of the optical fibers 100 can be further suppressed.

Fifth Embodiment

Figure 23:
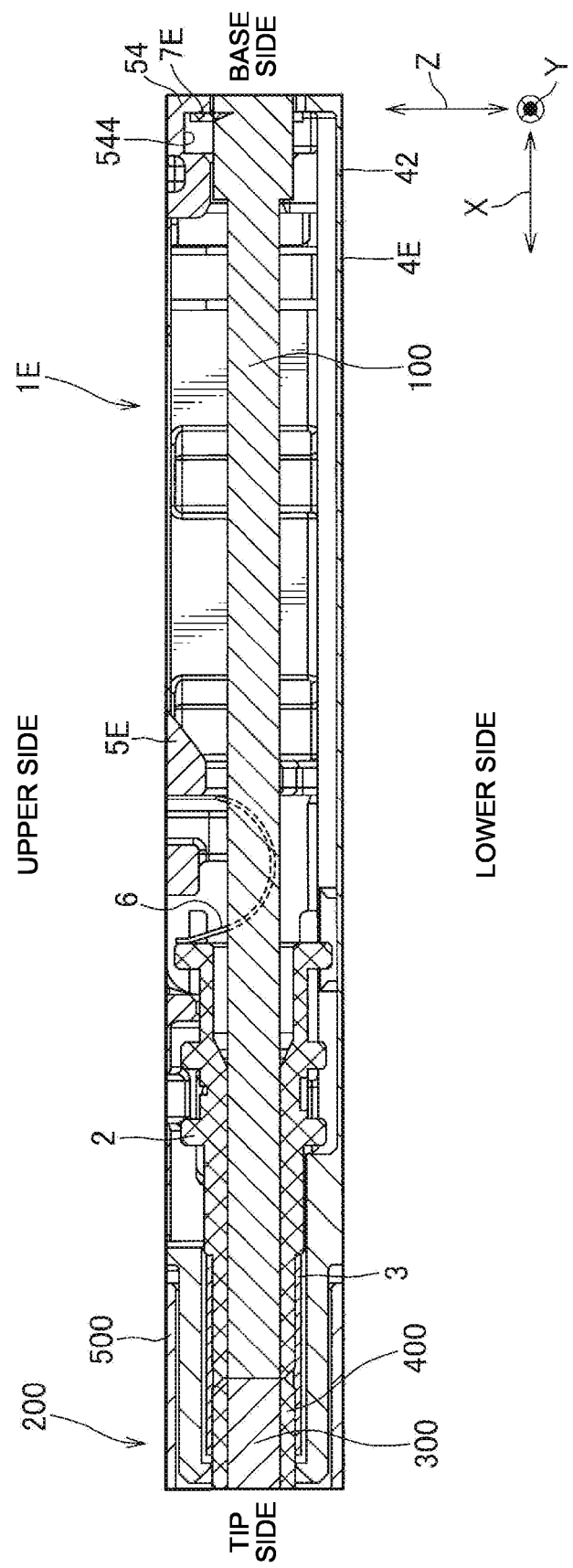
FIG. 23 is a sectional view showing an optical connector according to a fifth embodiment of the present invention.

FIG. 23 is a sectional view showing an optical connector 1E according to a fifth embodiment of the present invention.

The optical connector 1E according to the fifth embodiment includes the ferrules 2, the slit sleeves 3, a housing 4E, a spacer 5E, the spring 6, and a pressure crimping blade 7E.

In a lower surface of the base-end wall part 54 of the spacer 5E, a second housing groove part 544 which houses the pressure crimping blade 7E is formed. The second housing groove part 544 houses an upper end of the pressure crimping blade 7E, and is formed so as to have a width (a dimension in an X direction) which is sufficiently larger than a thickness of the pressure crimping blade 7E. That is, a width of the second housing groove part 544 has a dimension which allows the pressure crimping blade 7E to move in an X direction within the second housing groove part 544.

The above-described embodiment would produce the following effects. Specifically, even if an error is caused in a position of the pressure crimping blade 7E at the time of assembly, it is possible to house the pressure crimping blade 7E in the second housing groove part 544 while coping with such an error because the pressure crimping blade 7E is movable in an X direction within the second housing groove part 544. For example, consider a case where a normal position of the pressure crimping blade 7E is set at an approximately central portion in an X direction in the second housing groove part 544. Even if the pressure crimping blade 7E is placed in a position closer to a base end than a normal position when the ferrules 2 are housed in the tip-end housing parts 46, it is possible to suppress deflection of the optical fibers 100 because the pressure crimping blade 7E can be placed and housed on a base side in the second housing groove part 544. Also, even if the pressure crimping blade 7E is placed in a position closer to a tip end than a normal position, it is possible to prevent an end surface of the pressure crimping blade 7E from going away from end surfaces of the optical fibers 300 when the optical fibers 100 are pulled toward a base end, because the pressure crimping blade 7E can be placed and housed on a tip side in the second housing groove part 544.

Sixth Embodiment

Figure 24:
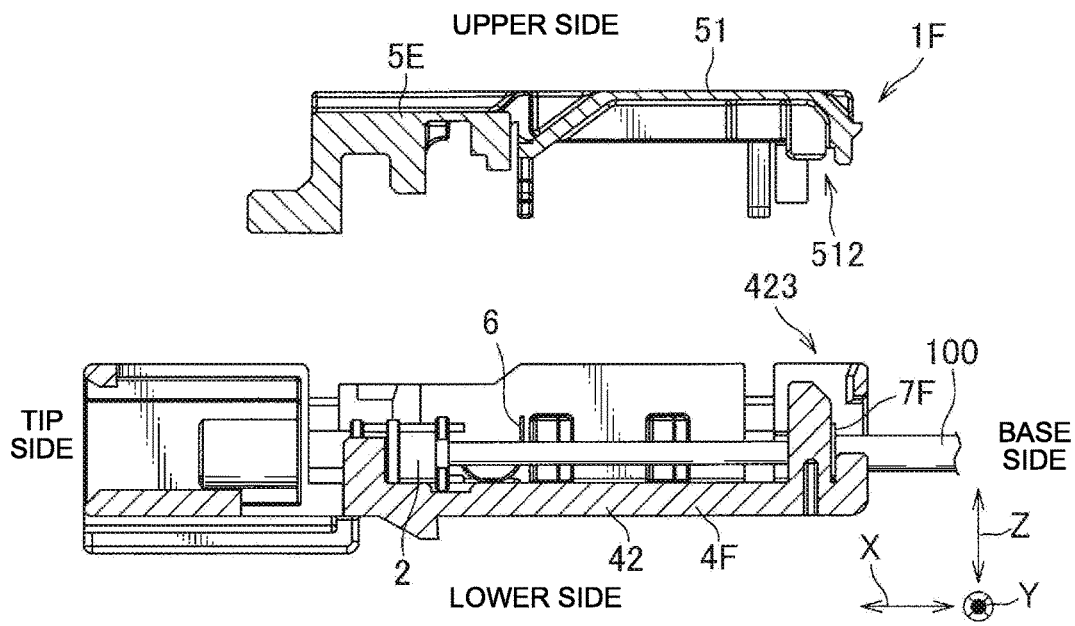
FIG. 24 is a sectional view showing an optical connector according to a sixth embodiment of the present invention.
Figure 25:
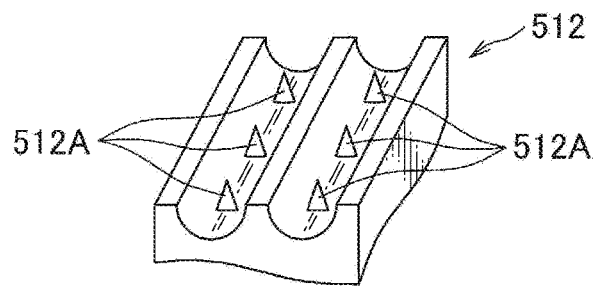
FIG. 25 is a perspective view showing principal parts of a lid part of the optical connector.
Figure 26:
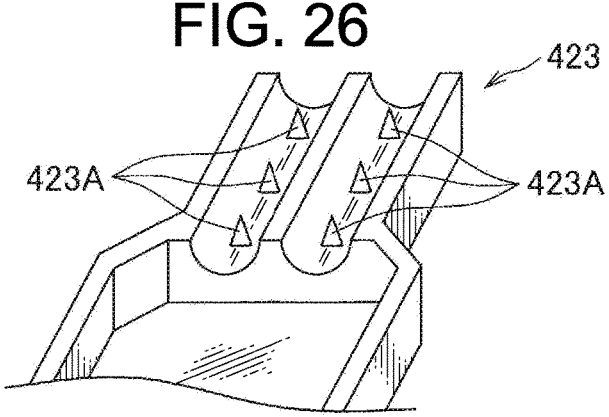
FIG. 26 is a perspective view showing principal parts of a housing of the optical connector.

FIG. 24 is a sectional view showing an optical connector 1F according to a sixth embodiment of the present invention. FIG. 25 is a perspective view showing principal parts of a spacer 5F of the optical connector 1F. FIG. 26 is a perspective view showing principal parts of a housing 4F of the optical connector 1F. The optical connector 1F according to the sixth embodiment includes the ferrules 2, the housing 4F, the spacer 5F, and the spring 6.

On a base side of the bottom surface part 42 of the housing 4F, a first fiber holding part 423 for holding the optical fibers 100 is provided. In a position corresponding to the first fiber holding part 423 in the lid plate part 51 of the spacer 5F, a second fiber holding part 512 for holding the optical fibers 100 is provided. When the spacer 5F is mounted in the housing 4F, the fiber holding parts 423 and 512 forma holding part having a cylindrical inner surface. The holding part is configured so as to come into contact with outer surfaces of the optical fibers 100.

As shown in FIGS. 25 and 26, the first fiber holding part 423 and the second fiber holding part 512 include protrusion parts 423A and 512A which protrude from inner surfaces, respectively. The protrusion parts 423A and 512A are formed integrally with the first fiber holding part 423 and the second fiber holding part 512, respectively, and are shaped conically, for example. Also, the protrusion parts 423A and 512A are engaged in outer surfaces of the optical fibers 100 when the optical fibers 100 are held by the fiber holding parts 423 and 512, so that the protrusion parts 423A and 512A serve as movement restraining parts which restrain the optical fibers 100 from moving in an X direction.

The above-described present embodiment would produce the following effects. Specifically, because of inclusion of the protrusion parts 423A and 512A which serve as movement restraining parts in the housing 4F and the spacer 5F, movement of the optical fibers 100 is suppressed in a case where an external force which pulls out the optical fibers 100 from the housing 4F is applied, which makes it difficult for the ferrules 2 to go away from mating optical fibers. Thus, efficiency in communication with a mating optical connector can be improved.

Further, by bringing the protrusion parts 423A and 512A into contact with outer surfaces of the optical fibers 100 and engaging the protrusion parts 423A and 512A in outer surfaces of the optical fibers 100, it is possible to suppress the optical fibers 100. Also, since the protrusion parts 423A and 512A are formed integrally with the housing 4F and the spacer 5F, respectively, the number of parts can be reduced.

Seventh Embodiment

Figure 27:
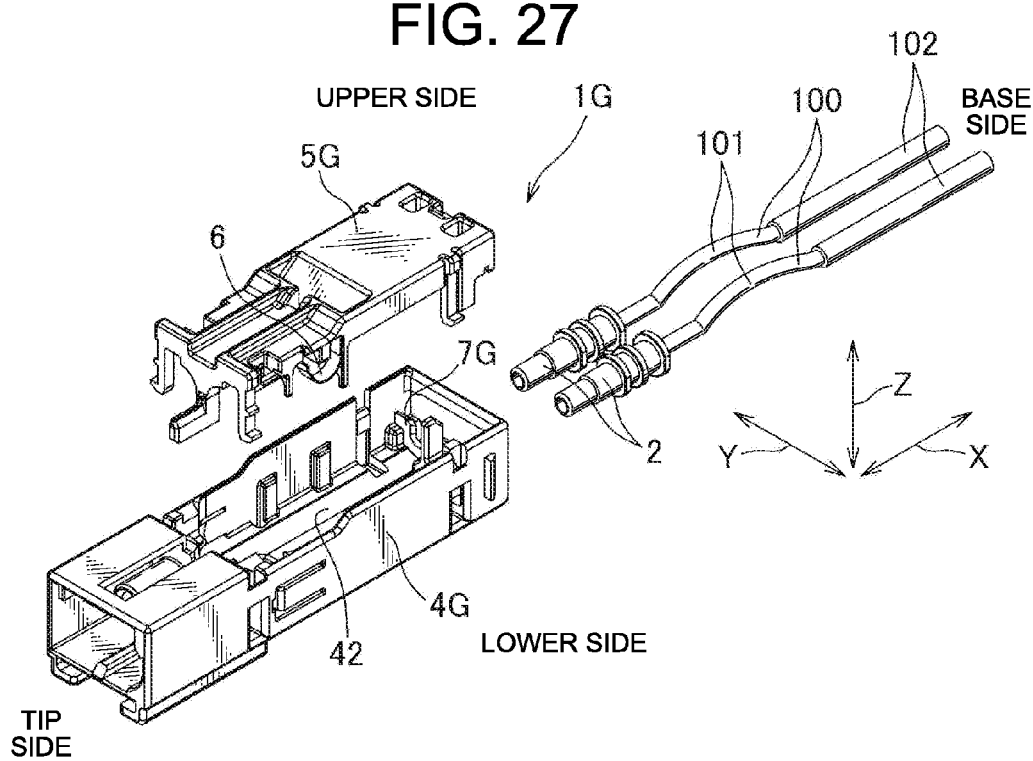
FIG. 27 is a perspective view showing a whole of an optical connector according to a seventh embodiment of the present invention.
Figure 28:
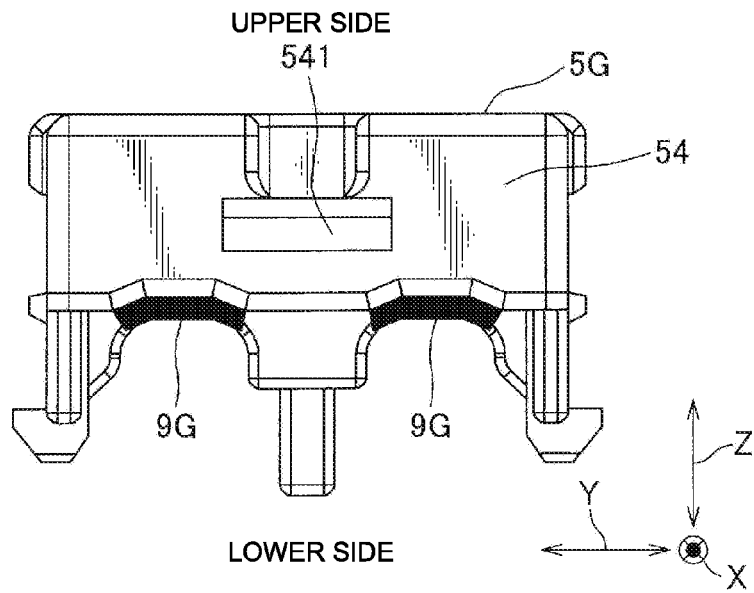
FIG. 28 is a back view showing a lid part of the optical connector.
Figure 29:
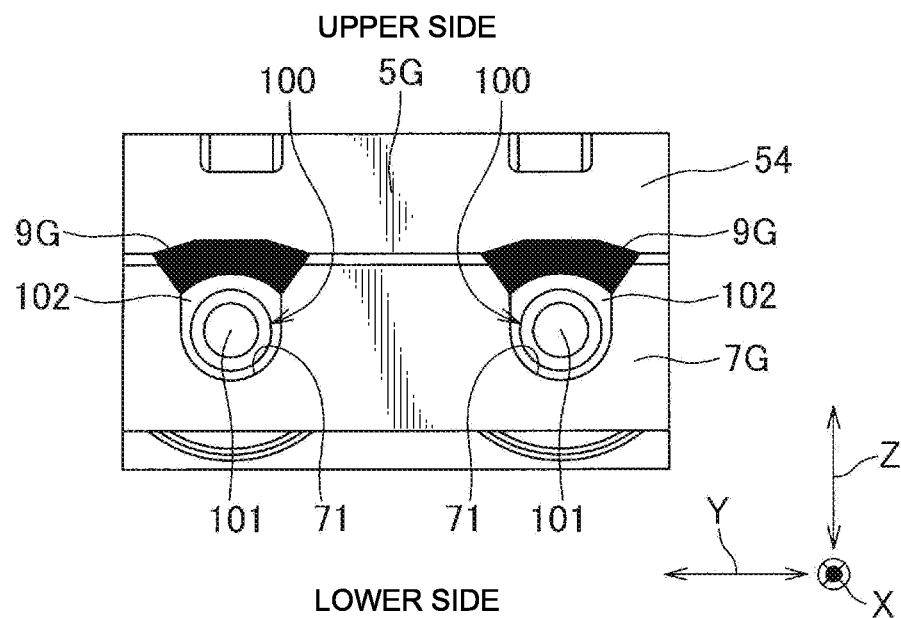
FIG. 29 is a back view showing the optical connector.

FIG. 27 is a perspective view showing a whole of an optical connector 1G according to a seventh embodiment of the present invention. FIG. 28 is a back view showing a spacer 5G of the optical connector 1G. FIG. 29 is a back view showing the optical connector 1G. The optical connector 1G according to the seventh embodiment includes the ferrules 2, a housing 4G, the spacer 5G, the spring 6, and a pressure crimping blade 7G.

At a lower end of the base-end wall part 54 of the spacer 5G, rubber members 9G serving as elastic members are provided. Each of the rubber members 9G is formed in a shape of a plate, and has a lower surface which is formed in a concave shape.

The pressure crimping blade 7G is attached to the bottom surface part 42 of the housing 4G in such a manner that the recess parts 71 are open upward. Also, a position where the pressure crimping blade 7G is attached in the housing 4G corresponds to a position where the rubber members 9G are attached in the spacer 5G. It is noted that while the pressure crimping blade 7G should include the recess parts 71 in which the optical fibers 100 are to be placed, the pressure crimping blade 7G can have either the same shape as the pressure crimping blade 7A according to the above-described first embodiment, or a shape suitable for attachment to the housing 4G.

When the ferrules 2 are housed in the housing 4G and the spacer 5G is mounted in the housing 4G, the optical fibers 100 are sandwiched and pressed between the pressure crimping blade 7G and the rubber members 9G as shown in FIG. 29. At that time, the pressure crimping blade 7G is engaged in the cover parts 102 of the optical fibers 100, and is engaged also in the rubber members 9G. Further, the rubber members 9G come into contact with outer surfaces of the cover parts 102 so as to extend along the outer surfaces of the cover parts 102. In this manner, the pressure crimping blade 7G and the rubber members 9G form a movement restraining part.

The above-described present embodiment would produce the following effects. Specifically, as a result of the optical fibers 100 being sandwiched between the pressure crimping blade 7G and the rubber members 9G, movement of the optical fibers 100 can be effectively suppressed by utilizing a friction force caused between the rubber members 9G and the optical fibers 100. Also, because of provision of the pressure crimping blade in the bottom surface part 42 and provision of the rubber members 9G in the spacer 5G, the optical fibers 100 can be pressed by the rubber members 9G with the use of a weight of the spacer 5G, so that movement of the optical fibers 100 can be more effectively suppressed.

Further, because of engagement of the pressure crimping blade 7G in the rubber members 9G, the rubber members 9G are restrained from being deformed in an X direction, which suppresses movement of the optical fibers 100 which is likely to move due to deformation of the rubber members 9G when the optical fibers 100 are pulled in an X direction.

Eighth Embodiment

Figure 30:
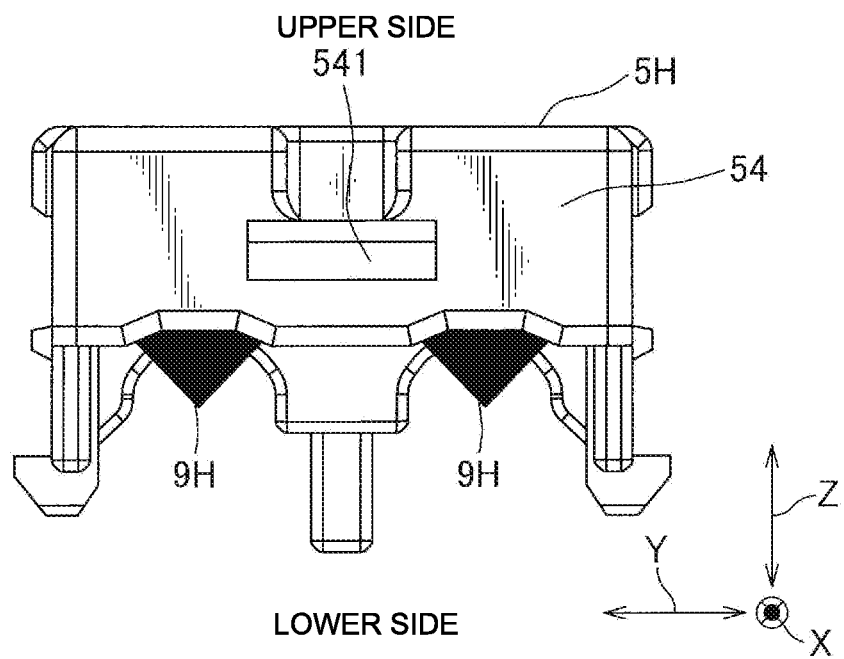
FIG. 30 is a back view showing a lid part of an optical connector according to an eighth embodiment of the present invention.
Figure 31:
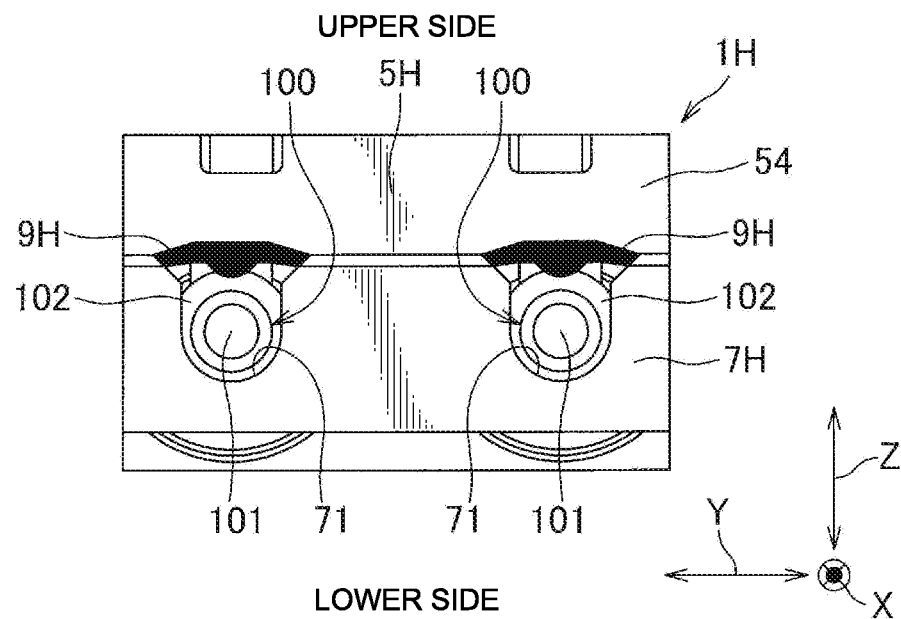
FIG. 31 is a back view showing the optical connector.

FIG. 30 is a back view showing a spacer 5H of an optical connector 1H according to an eighth embodiment of the present invention. FIG. 31 is a back view showing the optical connector 1H. The optical connector 1H according to the eighth embodiment is identical to the optical connector 1G according to the seventh embodiment in which the rubber members 9G are replaced with rubber members 9H.

As shown in FIG. 30, each of the rubber members 9H has a tapering shape which is convex downward. More specifically, each of the rubber members 9H is in a triangular shape as viewed from an X direction, and has a corner portion at a tip end thereof. When ferrules are housed in a housing and the spacer 5H is mounted in the housing, the optical fibers 100 are sandwiched and pressed between a pressure crimping blade 7H and the rubber members 9H as shown in FIG. 31. At that time, tip ends of the rubber members 9H are engaged in the cover parts 102 while being slightly deformed.

The above-described present embodiment would produce the following effects. Specifically, since each of the rubber members 9H is in a tapering shape, a pressure applied when tip ends of the rubber members 9H are brought into contact with the optical fibers 100 can be improved, so that movement of the optical fibers 100 can be further suppressed.

Ninth Embodiment

Figure 32:
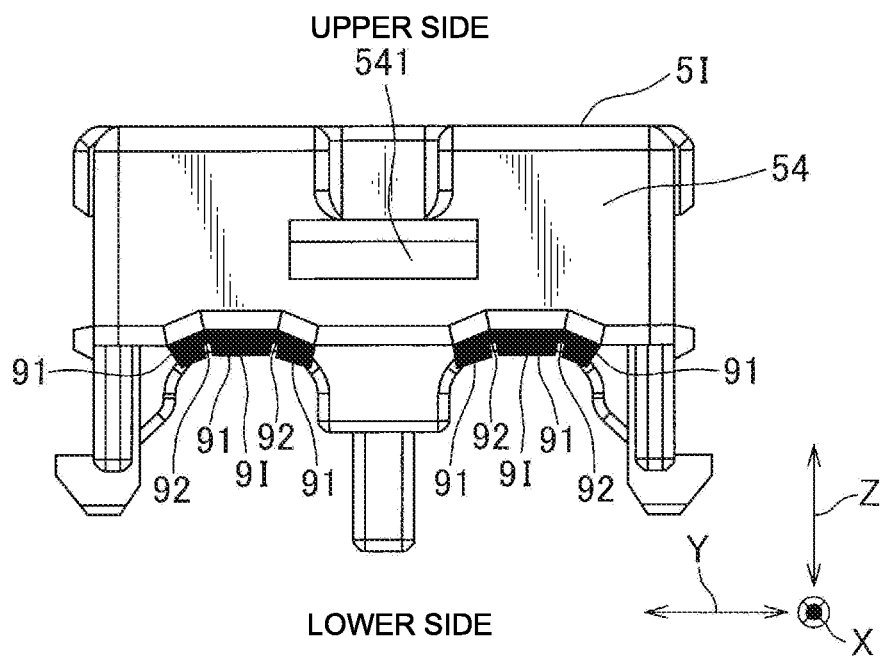
FIG. 32 is a back view showing a lid part of an optical connector according to a ninth embodiment of the present invention.
Figure 33:
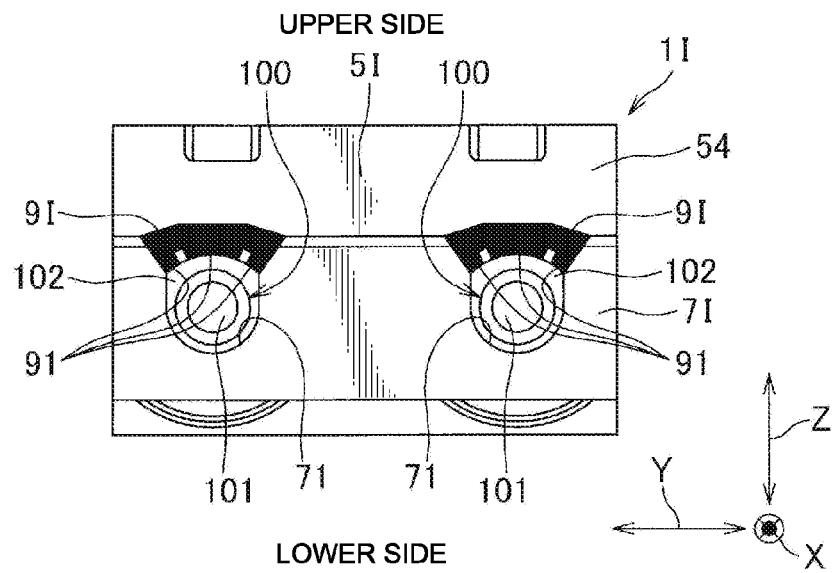
FIG. 33 is a back view showing the optical connector.

FIG. 32 is a back view showing a spacer 5I of an optical connector 1I according to a ninth embodiment of the present invention. FIG. 33 is a back view showing the optical connector 1I. The optical connector 1I according to the ninth embodiment is identical to the optical connector 1G according to the seventh embodiment in which the rubber members 9G are replaced with rubber members 9I.

As shown in FIG. 32, each of the rubber members 9I includes a lower surface (i.e., a surface facing the optical fiber 100) having irregularities. More specifically, a recess part 91 and a convex part 92 which extend in an X direction are formed in a lower surface of each of the rubber members 9I, and thus, a lower surface of each of the rubber members 9I has a corrugated shape. When ferrules are housed in a housing and the spacer 5I is mounted in the housing, the optical fibers 100 are sandwiched and pressed by a pressure crimping blade 7I and the rubber members 9I, as shown in FIG. 33. Also, similarly to the seventh embodiment, the pressure crimping blade 7I is engaged in the cover parts 102 of the optical fibers 100, and is engaged also in the rubber members 9I. Further, the convex parts 92 of the rubber members 9I come into contact with outer surfaces of the cover parts 102 so as to extend along the outer surfaces of the cover parts 102.

The above-described present embodiment would produce the following effects. Specifically, because of inclusion of irregularities in surfaces of the rubber members 9I, which face the optical fibers 100, the convex parts 92 can be brought into contact with the optical fibers 100, so that a pressure applied to the optical fibers 100 by the rubber members 9I can be improved. As a result, movement of the optical fibers 100 can be further suppressed.

Tenth Embodiment

Figure 34:
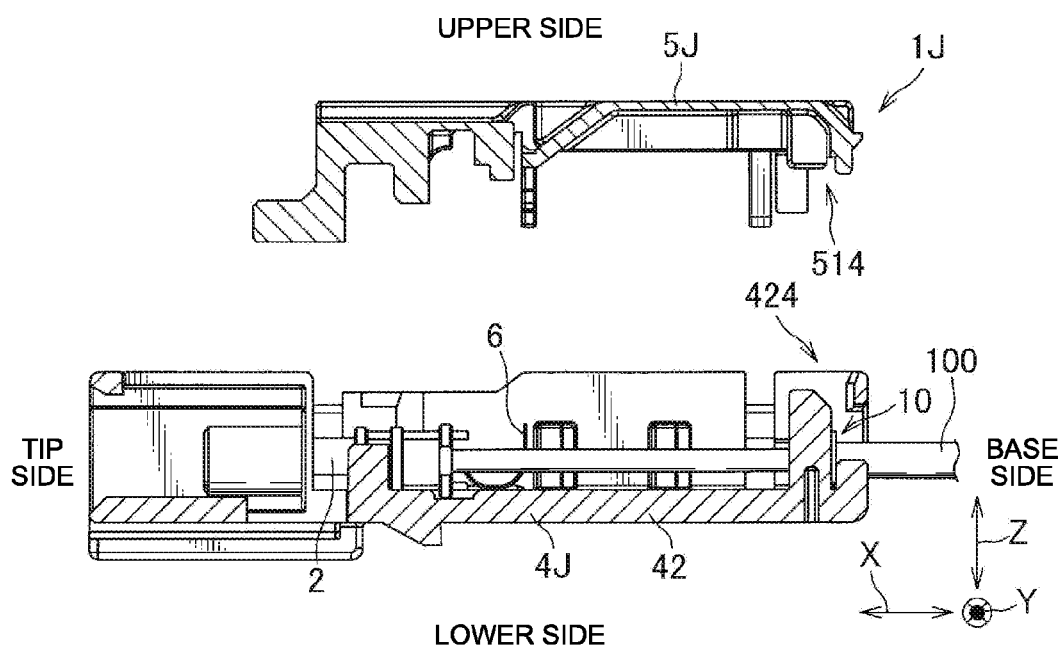
FIG. 34 is a sectional view showing an optical connector according to a tenth embodiment of the present invention.
Figure 35A:
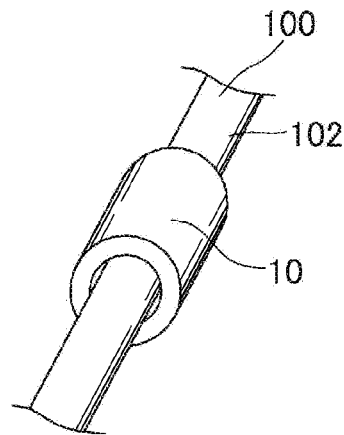
FIG. 35A is a perspective view showing a crimping member of the optical connector.
Figure 35B:
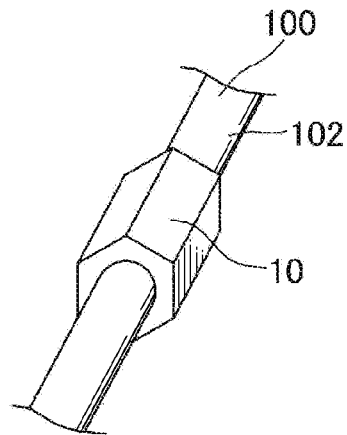
FIG. 35B is a perspective view showing a crimping member of the optical connector.
Figure 36:
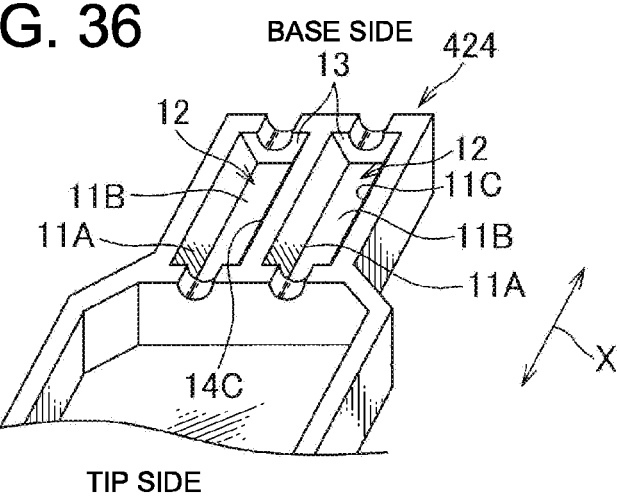
FIG. 36 is a perspective view showing principal parts of a housing of the optical connector.
Figure 37:
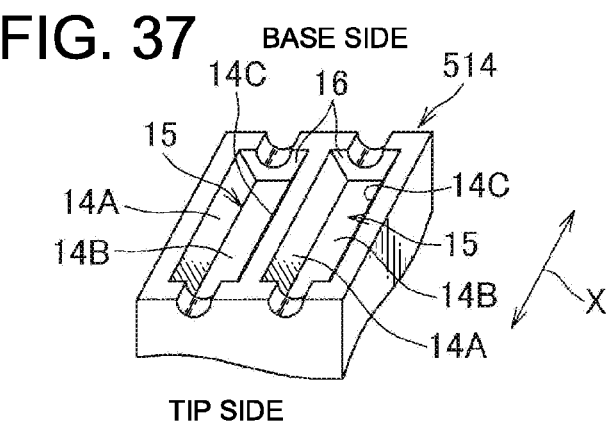
FIG. 37 is a perspective view showing principal parts of a lid part of the optical connector.

FIG. 34 is a sectional view showing an optical connector 1J according to a tenth embodiment of the present invention. FIGS. 35A and 35B are perspective views showing a crimping member 10 of the optical connector 1J. FIG. 36 is a perspective view showing principal parts of a housing 4J of the optical connector 1J. FIG. 37 is a perspective view showing principal parts of a spacer 5J of the optical connector 1J. The optical connector 1J according to the tenth embodiment includes the ferrules 2, the housing 4J, the spacer 5J, the spring 6, and the crimping member 10.

On a base side of the bottom surface part 42 of the housing 4J, a third fiber holding part 424 for holding the optical fibers 100 is provided. In a position corresponding to the third fiber holding part 424 in the lid plate part 51 of the spacer 5J, a fourth fiber holding part 514 for holding the optical fibers 100 is provided.

The crimping member 10 is formed of an appropriate metal having ductility, and is formed in a cylindrical shape in a state before crimping as shown in FIG. 35A. When the optical fiber 100 is inserted into the crimping member 10 to penetrate through the crimping member 10 and crimping is conducted with the use of an appropriate jig, the crimping member 10 is crimped onto an outer surface of the optical fiber 100 as shown in FIG. 35B, so that the crimping member 10 is shaped into a hexagonal column. Additionally, a shape of the crimping member 10 is not limited to a hexagonal column, and the crimping member 10 may be shaped into any other polygonal column.

As shown in FIG. 36, the third fiber holding part 424 includes housing groove parts 12 each of which includes contact surface parts 11A-11C which come into contact with three side surfaces of the crimping member 10, respectively, and retreat restraining parts 13 which are provided on a base side of the housing groove parts 12 and can come into contact with the crimping member 10 from a base side. As shown in FIG. 37, the fourth fiber holding part 514, like the third fiber holding part 424, includes housing groove parts 15 each of which includes contact surface parts 14A-14C and retreat restraining parts 16. When the spacer 5J is mounted in the housing 4J, the fiber holding parts 424 and 514 form a holding part which has an inner surface shaped into a hexagonal column. Such the holding part is configured so as to hold the crimping member 10 which is crimped onto outer surfaces of the optical fibers 100.

The above-described present embodiment would produce the following effects. Specifically, since the retreat restraining parts 13 and 16 which can come into contact with the crimping member 10 crimped onto outer surfaces of the optical fibers 100, from a base side, are provided in the housing 4J and the spacer 5J, it is possible to make it difficult for the ferrules 2 to go away from mating optical fibers in a case where an external force which pulls out the optical fibers 100 from the housing 4J is applied. As a result, efficiency in communication with a mating optical connector can be improved. Also, since side surfaces which form the housing groove parts 12 and 15 come into contact with three side surfaces of the crimping member 10 shaped into a hexagonal column, respectively, the optical fibers 100 are restrained from rotating about an X direction as a rotation axis. Thus, poor connection with a mating connector can be prevented.

It should be noted that the present invention is not limited to the above-described embodiments, and the present invention includes any other structures and the like that can achieve the object of the present invention, and also includes the following modifications and the like.

For example, while a pressure crimping blade serving as a pressure crimping member is provided in a position closer to a spacer than optical fibers in the first to fifth embodiments, and a pressure crimping blade is provided in a housing in the seventh embodiment, a pressure crimping blade may be provided in either position. Also, in a case where a pressure crimping blade is provided in a position closer to a spacer in the optical connector according to the seventh embodiment, no inconvenience is caused by provision of a rubber member in a housing.

Further, respective structures according to the above-described first to tenth embodiments may be appropriately combined with each other. For example, a pressure crimping blade may be provided in the tenth embodiment in which a crimping member, housing groove parts, and retreat restraining parts are provided. Alternatively, a pressure crimping blade may be provided in the sixth embodiment in which a protrusion part serving as a movement restraining part is provided.

In addition, while the best structures, methods, and the like for carrying out the present invention are disclosed in the above description, the present invention is not limited to the above description. That is, though the present invention is particularly shown in the drawings and described, chiefly regarding specific embodiments, the skilled person could add various modifications to shapes, materials, volumes, and other detailed structural matters in the above-described embodiments without departing from the scope of a technical idea and an object of the present invention. Therefore, since the above description which limits shapes, materials, and the like as disclosed above is made as an example for easier understanding of the present invention, and does not limit the present invention, description of members with names which remove apart or all of limitations on those shapes, materials, and the like is included in the present invention.

REFERENCE SIGNS LIST 1A-1J Optical connector
2 Ferrule (connection end part)
4A-4J Housing
5A-5J Spacer (lid part)
7A-7I Pressure crimping blade (pressure crimping member)
9G-9I Rubber member (elastic member)
10 Crimping member
12, 15 Housing groove part
13, 16 Retreat restraining part
40 Opening part
42 Bottom surface part (facing surface part)
421 First housing groove part
422 Stopper wall part
543, 544 Second housing groove part
423A, 512A Protrusion part (movement restraining part)
71 Recess part

What is claimed is:
1. An optical connector comprising:
a connection end part to be provided at a tip end of an optical fiber;
a housing which houses the connection end part and includes an opening part in a top surface;
a lid part which is attached to the housing so as to cover the opening part; and
a plate-shaped pressure crimping member which includes a recess part where the optical fiber is placed,
wherein
the plate-shaped pressure crimping member is provided in such a manner that an opening of the recess part opens toward a bottom surface of the housing, and
the plate-shaped pressure crimping member is configured such that when the lid part is attached to the housing, the optical fiber is sandwiched and pressed between the pressure crimping member and the bottom surface, such that the optical fiber is prevented from moving along a lengthwise direction of the optical fiber and which cover part is not pierced.

2. The optical connector according to claim 1, wherein the housing includes a first housing groove part which houses the pressure crimping member, and a stopper wall part which is erected from the bottom surface and retrains the pressure crimping member from moving from the first housing groove part toward a tip end of the optical fiber.

3. The optical connector according to claim 1, wherein the pressure crimping member is formed integrally with the lid part.

4. The optical connector according to claim 3, wherein the lid part has an end which is closer to a base end of the optical fiber and is a free end, and an end which is closer to a tip end of the optical fiber and is pivotally supported by the housing, and
the pressure crimping member is provided on a side where the free end is provided.

5. The optical connector according to claim 1, wherein the lid part includes a second housing groove part which houses a portion of the pressure crimping member, which is opposite to the recess part.

6. The optical connector according to claim 5, wherein the second housing groove part has a dimension which allows the pressure crimping member to move in a lengthwise direction of the optical fiber within the second housing groove part.

7. An optical connector comprising:
a connection end part to be provided at a tip end of an optical fiber;
a housing which houses the connection end part and includes an opening part in a top surface; and
a lid part which is attached to the housing so as to cover the opening part,
wherein at least one of the housing and the lid part includes a plurality of movement restraining parts which directly contacts with the optical fiber, to restrain the optical fiber from moving in a lengthwise direction, and
wherein the movement restraining part is located inside of the housing when the lid part is attached to the housing.

8. The optical connector according to claim 7, wherein the movement restraining part is a protrusion part which protrudes from the housing or the lid part.

9. The optical connector according to claim 7, wherein
the movement restraining part includes a plate-shaped pressure crimping member which is provided in one of the housing and the lid part, and an elastic member which is provided in the other of the housing and the lid part, and
the pressure crimping member includes a recess part where the optical fiber is placed, which is open to the other of the housing and the lid part, and the lid part is attached to the housing, so that the optical fiber is sandwiched and pressed between the pressure crimping member and the elastic member.

10. The optical connector according to claim 9, wherein the elastic member has a tapering shape and abuts on the optical fiber at a tip end.

11. The optical connector according to claim 9, wherein the elastic member includes irregularities on a side closer to the optical fiber.

12. An optical connector comprising:
a connection end part to be provided at tip end of an optical fiber;
a housing which houses the connection end part and includes an opening part in a top surface;
a lid part which is attached to the housing so as to cover the opening part; and
a crimping member made of metal which is crimped onto an outer surface of the optical fiber and is formed in a shape of a polygonal column,
wherein at least one of the housing and the lid part includes
a housing groove part which comes into contact with a plurality of side surfaces of the crimping member, the side surfaces extending in a lengthwise direction of the crimping member, and
a retreat restraining part provided at a base end of the housing groove located on a base end side of the optical fiber, the retreat restraining part being configured to come into contact with the crimping member from the base end side of the housing groove, thereby preventing the optical fiber from moving in a lengthwise direction of the optical fiber and from rotating about a rotational axis corresponding to the lengthwise direction.

13. The optical connector according to claim 2, wherein the lid part includes a second housing groove part which houses a portion of the pressure crimping-member, which is opposite to the recess part.

* * * * *